US012181416B2

(12) United States Patent
Soto et al.

(10) Patent No.: US 12,181,416 B2
(45) Date of Patent: Dec. 31, 2024

(54) CONFIGURABLE HANDHELD BIOLOGICAL ANALYZERS FOR IDENTIFICATION OF BIOLOGICAL PRODUCTS BASED ON RAMAN SPECTROSCOPY

(71) Applicant: AMGEN INC., Thousand Oaks, CA (US)

(72) Inventors: Robert Joseph Soto, Thousand Oaks, CA (US); David Meriage, Thousand Oaks, CA (US)

(73) Assignee: AMGEN INC., Thousand Oaks, CA (US)

( * ) Notice: Subject to any disclaimer, the term of this patent is extended or adjusted under 35 U.S.C. 154(b) by 356 days.

(21) Appl. No.: 17/770,782

(22) PCT Filed: Oct. 23, 2020

(86) PCT No.: PCT/US2020/056961
§ 371 (c)(1),
(2) Date: Apr. 21, 2022

(87) PCT Pub. No.: WO2021/081263
PCT Pub. Date: Apr. 29, 2021

(65) Prior Publication Data
US 2022/0390375 A1    Dec. 8, 2022

Related U.S. Application Data

(60) Provisional application No. 63/043,976, filed on Jun. 25, 2020, provisional application No. 62/925,893, filed on Oct. 25, 2019.

(51) Int. Cl.
G01J 3/44      (2006.01)
G01J 3/02      (2006.01)
G01N 21/65    (2006.01)

(52) U.S. Cl.
CPC ............ *G01N 21/65* (2013.01); *G01J 3/0272* (2013.01); *G01J 3/44* (2013.01); *G01N 2201/0221* (2013.01)

(58) Field of Classification Search
CPC .......... G01N 21/65; G01N 2201/0221; G01N 2201/129; G01J 3/0272; G01J 3/44; G01J 3/0264; G01J 3/28
See application file for complete search history.

(56) References Cited

U.S. PATENT DOCUMENTS 8,859,969 B2   10/2014  Micheels et al.
10,810,408 B2  10/2020  Hsiung et al.
(Continued)

FOREIGN PATENT DOCUMENTS

CL    201803280      1/2019
CN    101303294 B    8/2010
(Continued)

OTHER PUBLICATIONS

Crews et al., "Multiwave calibration of energy-dispersive X-ray diffraction data for predicting the composition of pharmaceutical tablets in packaging," Jounral of Pharmaceutical and Biomedical Analysis 151: 186-193 (2018).
(Continued)

Primary Examiner — Abdullahi Nur
(74) Attorney, Agent, or Firm — Marshall Gerstein & Borun LLP

(57) ABSTRACT

Configurable handheld biological analyzers and related biological analytics methods are described for identification of biological products based on Raman spectroscopy. A biological classification model configuration is loaded into a computer memory of a configurable handheld biological analyzer having a processor and a scanner. The biological classification model configuration includes a biological clas-
(Continued)

sification model configured to receive a Raman-based spectra dataset defining a biological product sample as scanned by the scanner. A spectral preprocessing algorithm is executed to reduce a spectral variance of the Raman-based spectra dataset. The biological classification model identifies a biological product type based on the Raman-based spectra dataset and further based on a classification component selected to reduce at least one of (1) a Q-residual error or (2) a summary-of-fit value of the biological classification model. The biological classification model configuration is transferrable to and loadable on other configurable handheld biological analyzers.

20 Claims, 15 Drawing Sheets

(56) References Cited

U.S. PATENT DOCUMENTS

| | | | |
|---|---|---|---|
| 2003/0154044 A1 | 8/2003 | Lundstedt et al. | |
| 2006/0279732 A1 | 12/2006 | Wang et al. | |
| 2007/0224683 A1* | 9/2007 | Clarke ................ | G01N 21/65 356/301 |
| 2009/0101843 A1 | 4/2009 | Henshaw et al. | |
| 2010/0241357 A1 | 9/2010 | Chan et al. | |
| 2011/0317158 A1 | 12/2011 | Lyng et al. | |
| 2012/0035442 A1 | 2/2012 | Barman et al. | |
| 2012/0203086 A1* | 8/2012 | Rorabaugh .......... | A61B 5/0068 600/321 |
| 2013/0231573 A1 | 9/2013 | Zeng et al. | |
| 2016/0061663 A1* | 3/2016 | Marquardt ............ | G01J 3/0218 340/540 |
| 2016/0110584 A1* | 4/2016 | Remiszewski ......... | G06V 20/69 382/133 |
| 2016/0140870 A1 | 5/2016 | Connor | |
| 2016/0177366 A1 | 6/2016 | Auner et al. | |
| 2017/0191947 A1 | 7/2017 | Gilliam et al. | |
| 2017/0292908 A1 | 10/2017 | Wilk et al. | |
| 2019/0108851 A1* | 4/2019 | Soulodre ................ | G10L 19/26 |

FOREIGN PATENT DOCUMENTS

| | | |
|---|---|---|
| CN | 101933028 A | 12/2010 |
| CN | 104764734 A | 7/2015 |
| TW | 201933261 A | 8/2019 |
| WO | WO-2009073463 A2 | 6/2009 |

OTHER PUBLICATIONS

Da Silva et al., "Portable near-infrared instruments: Application for quality control of polymorphs in pharmaceutical raw materials and calibration transfer," Journal of Pharmaceutical and Biomedical Analysis 134: 287-294 (2017).

International Application No. PCT/US2020/056961, International Search Report and Written Opinion, mailed Jan. 26, 2021.

Paudel et al., "Raman spectroscopy in pharmaceutical product design," Advanced Drug Delivery Review 89: 3-20 (2005).

Sulub et al., "Content uniformity determination of pharmaceutical tablets using five near-infrared reflectance spectrometers: A process analytical technology (PAT) approach using robust multivariate calibration transfer algorithms," Analytica Chemica Acta 611: 143-150 (2008).

Li et al., Rapid characterization and quality control of complex cell culture media solutions using raman spectroscopy and chemometrics, Biotechnol. Bioengineering, 107(2):290-301 (2010).

European Patent Application No. 20878855.4, Extended European Search Report, dated Nov. 3, 2023.

* cited by examiner

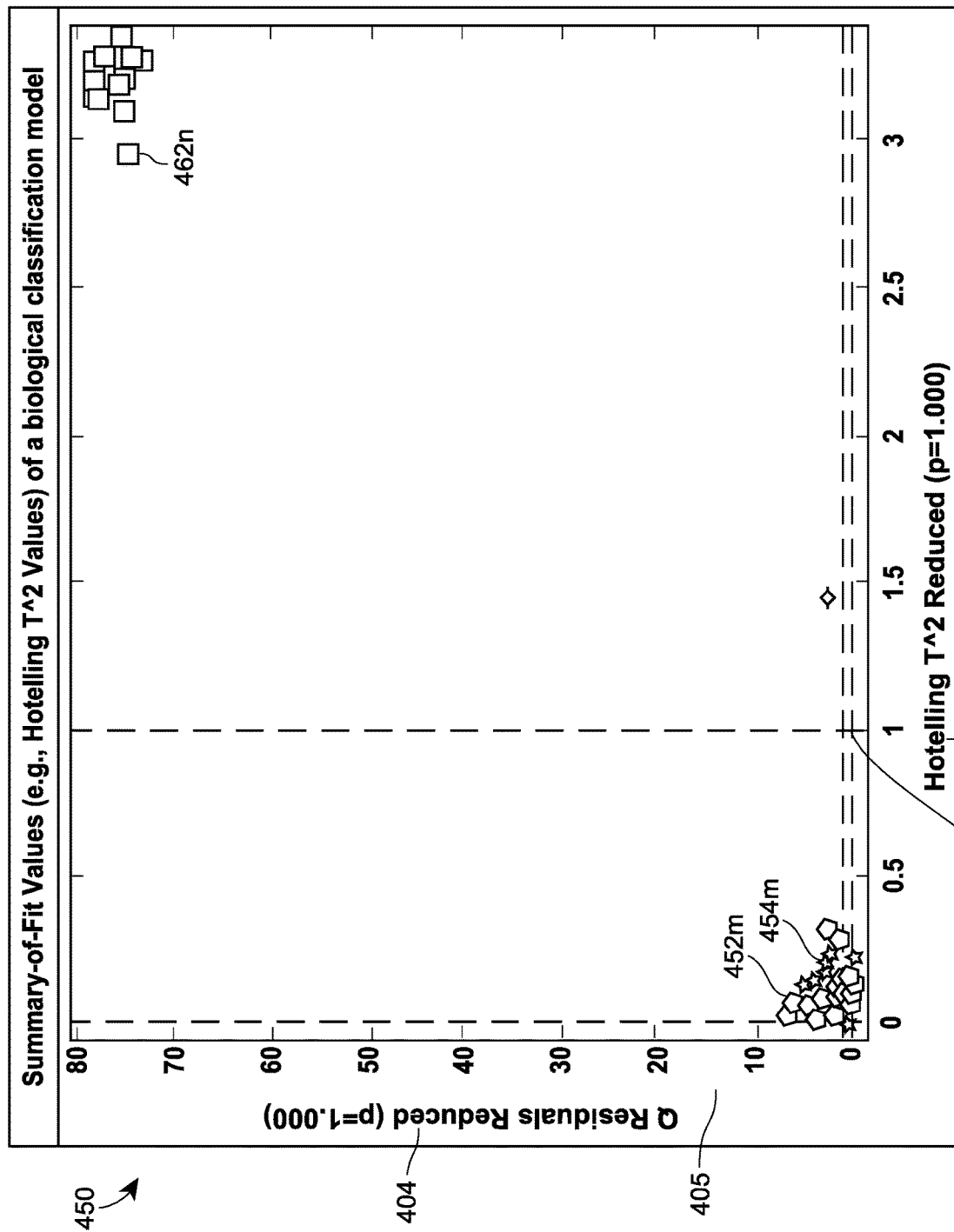

```
 1  Code Section 1
 2  <?xml version="1.0"?>
 3  <model>
 4  <modeltype class="string">PCA<modeltype>
 5  ...
 6
 7  Code Section 2
 8  <sr>Included: [ 1-293 ] [ 269-962 ] </sr>
 9  <sr>Included (in axis units): [ 1-1041 ] [ 598.4-1499.3 ] </sr>
10  <sr>Preprocessing: 1st Derivative (order: 2,window: 21 pt, incl only, tails:
11  polyinterp), SNV, Mean Center </sr>
12  <sr>Num. PCs: 1 </sr>
13  <sr>Algorithm: SVD </sr>
14  ...
15
16  Code Section 3
17  <datasource class="cell" size="[1,1]">
18  <name class="string">Multiple SPC Files</name>
19  <type class="string">data</type>
20  <date class="numeric" size="[1,6]">2019,4,10,11,10,37.844</date>
21  <moddate class="numeric" size="[1,6]">2019,4,18,9,53,48.384</moddate>
22  <size class="numeric" size="[1,2]">293,2020</size>
23  <include_size class="numeric" size="[1,2]">293,694</include_size>
24  <description class="string">
25  <sr>Run-rowagner-20170525-154858 </sr>
26  <sr>Run-ravakian-20170602-082421 </sr><sr>
27  <sr>Run-ravakian-20170622-093536 </sr><sr>
28  ...
29
30  Code Section 4
31  <script class="string">
32  <sr>cv = cols(x,c1); </sr>
33  <sr>cv = times(cv,c0); </sr>
34  <sr>cv = plus(cv,c1); </sr>
35  <sr>xsum = mtimes(cv,xsum); </sr>
36  <sr>dg1 = mtimes(cv,dg1); </sr>
37  <sr>dg2 = mtimes(cv,dg2); </sr>
38  <sr>dg3 = mtimes(cv,dg3); </sr>
39  <sr>dg4 = mtimes(cv,dg4); </sr>
40  <sr>dg5 = mtimes(cv,dg5); </sr>
41  <sr>dg6 = mtimes(cv,dg6); </sr>
42  <sr>dg7 = mtimes(cv,dg7); </sr>
43  <sr>dg8 = mtimes(cv,dg8); </sr>
44  <sr>dg9 = mtimes(cv,dg9); </sr>
45  <sr>dg10 = mtimes(cv,dg10); </sr>
46  ...
```

FIG. 6A

```
47  Code Section 5
48  <step>
49  <description class="string">Apply SNV</description>
50  <constants>
51  <offset class="numeric" size = "[1,1]">0</offset>
52  <m class="numeric" size = "[1,1]">694</m>
53  <A class="numeric"  size = "[694,1]">1; 1; 1; 1; 1; ...</A>
54  <At class="numeric" size = "[1,694]">1, 1, 1, 1, 1, ...</At>
55  <c2 class="numeric" size = "[1,1]">2</c2>
56  <c05 class="numeric" size = "[1,1]">0.5</c05>
57  <c1 class="numeric" size = "[1,1]">1</c1>
58  </constants>
59  <script class="string">
60  <sr>b = mtimes(x,A); </sr>
61  <sr>b = rdivide(b,m); </sr>
62  <sr>b = mtimes(b,At); </sr>
63  <sr>x = minus(x,b); </sr>
64  <sr>x2 = power(x,c2); </sr>
65  <sr>x2 = mtimes(x2,A); </sr>
66  <sr>m2 = minus(m,c1); </sr>
67  <sr>x2 = rdivide(x2,m2); </sr>
68  <sr>x2 = power (x2,c05); </sr>
69  <sr>x2 = plus (x2,offset); </sr>
70  <sr>x2 = mtimes(x2,At); </sr>
71  <sr>x = rdivide (x,x2); </sr>
72  </script>
73  </step>
74  ...
75
76  Code Section 6
77  <step>
78  <sequence class= "numeric" size="[1,1]">4</sequence>
79  <description class= "string"> Apply Mean Center</description>
80  <constants><m class="numeric" size="[1,694]">-0.686540905996,-
81  0.65403111506,-0.654254215746,-0.652271026855,-0.6342816221, ... </m>
82  <c1 class="numeric" size = "[1,1]">1</c1><c0 class="numeric"
83  size = "[1,1]" >0</c0></constants>
84  <script class="string">
85  <sr>cv = cols(x,c1); </sr>
86  <sr>cv = times(cv,c0); </sr>
87  <sr>cv = plus(cv,c1); </sr>
88  <sr>m = mtimes(cv,m); </sr>
89  <sr>x = minus(x,m); </sr>
90  </script>
91  </step>
92  ...
```

FIG. 6B

```
93   Code Section 7
94   <step>
95   <description class="string"> PCA Prediction</description>
96   <constants>
97   <loads class="numeric" size="[694,1]"> 0.152768287233; 0.126914743232;
98   0.115169496652; 0.0935524251239; 0.0677159234539; ... </loads>
99   ...
100
101  <script class="string">
102  <sr>scores = mtimes(x,loads); </sr>
103  <sr>Tcon= mtimes(scores,tconbasis); </sr>
104  <sr>loads = transpose(loads); </sr>
105  <sr>Xhat = mtimes(scores,loads); </sr>
106  <sr>Qcon = minus(x,Xhat); </sr>
107  <sr>temp = power(Tcon,c2); </sr>
108  <sr>T2 = mtimes(temp,sum); </sr>
109  <sr>T2 = rdivide(T2,tsqlim); </sr>
110  <sr>temp = power(Qcon,c2); </sr>
111  <sr>Q = mtimes(temp,sum); </sr>
112  <sr>Q = rdivide(Q,reslim); </sr>
113  </script>
114  </step>
115  ...
```

FIG. 6C

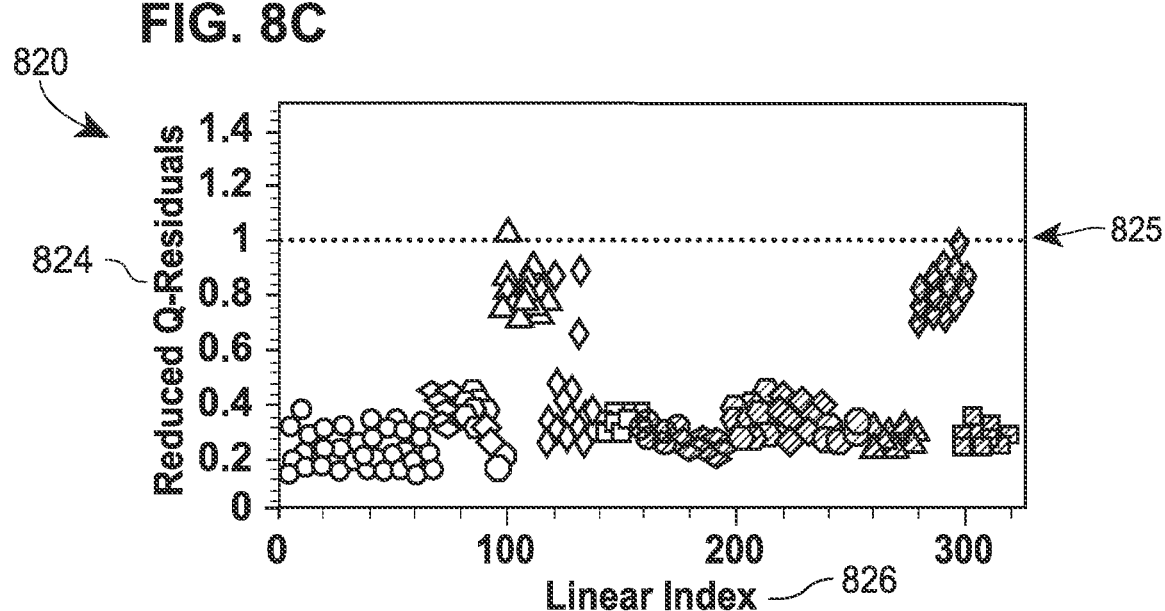
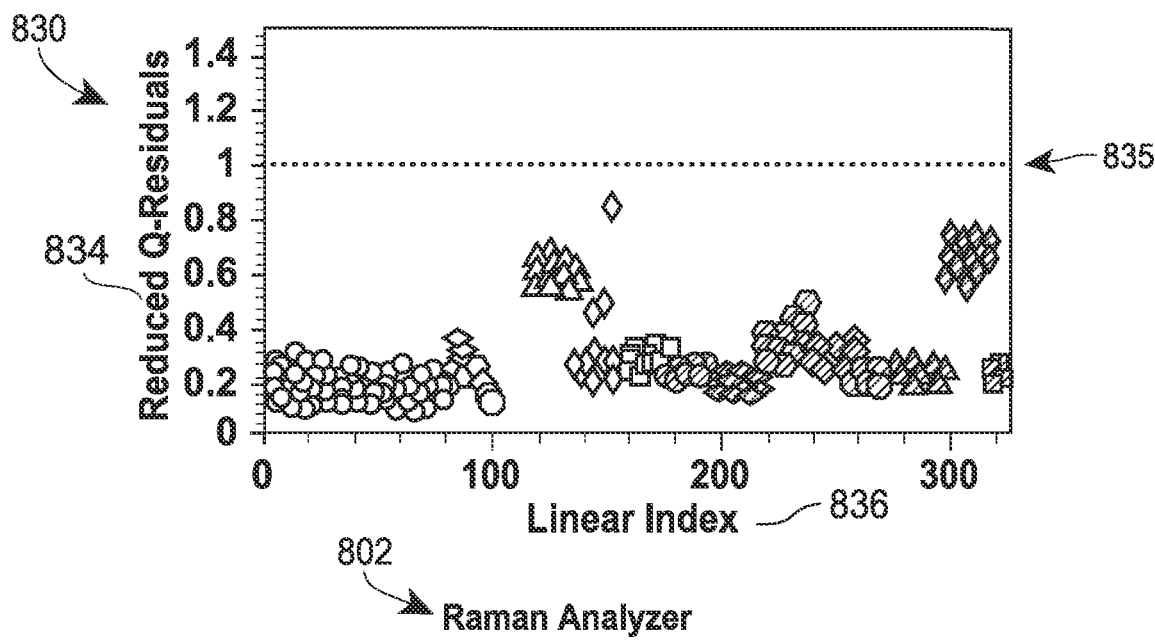

CONFIGURABLE HANDHELD BIOLOGICAL ANALYZERS FOR IDENTIFICATION OF BIOLOGICAL PRODUCTS BASED ON RAMAN SPECTROSCOPY

REFERENCE TO RELATED APPLICATIONS

This application claims the benefit of U.S. Provisional Application No. 62/925,893 (filed on Oct. 25, 2019); and U.S. Provisional Application No. 63/043,976 (filed on Jun. 25, 2020). The entirety of each of the foregoing provisional applications is incorporated by reference herein.

FIELD OF DISCLOSURE

The present disclosure generally relates to configurable handheld biological analyzers, and, more particularly, to systems and methods for using configurable handheld biological analyzers to identify or classify biological products based on Raman spectroscopy.

BACKGROUND

Development and manufacture of pharmaceutical and biotechnology products generally requires the measurement or identification of raw materials used to develop such products. The purpose of identification testing of products is to provide assurance of product identity. Situations that require identification testing include distribution of product to clinical sites, import testing, and transfer between network sites. In addition, measurement or identification of biological products can be important to ensure the quality of a development or manufacturing process, and, ultimately the quality of the finished products themselves, for the purpose of meeting quality standards and/or regulatory requirements.

The use of Raman spectroscopy for measurement and identification of biological products is a relatively new concept. Generally, Raman spectroscopy can be used to probe a chemical or biological structure of a raw material or product. Raman spectroscopy is a non-destructive chemical or biological analysis technique that measures the interaction of light with a product or material, such as the interaction of light with biological attributes or chemical bonds of a product or material. Raman spectroscopy provides a light scattering technique where a molecule of a sample material or product scatters incident light from a high intensity laser light source. Typically, most of the scattered light is at the same wavelength (color) as the laser source and does not provide useful information—this is called Rayleigh scatter. However a small amount of light is scattered at different wavelengths (colors), which is caused by the chemical or molecular structure of the material or product being analyzed—this is called Raman scatter, and may be analyzed or scanned to generate Raman-based data of the material or product being analyzed.

Analysis of Raman scatter can yield detailed information regarding the characteristics of a material or product, including its chemical structure and/or identity, contamination and impurity, phase and polymorphy, crystallinity, intrinsic stress/strain, and/or molecular interactions, etc. Such detailed information can be present in the Raman spectrum of a material. A Raman spectrum can be visualized to show a number of peaks across various light wavelengths. The Raman spectrum can show the intensity and wavelength position of the Raman scattered light. Each peak can correspond to a specific molecular bond vibration associated with the material or product being analyzed.

Typically, a Raman spectrum provides a distinct chemical or biological "fingerprint" for a particular material, molecule, or product, and can be used to verify the identity the particular material, molecule, or product—and/or distinguish it from others. In addition, Raman spectral libraries are often used for identification of a material based on its Raman spectrum. That is, Raman spectral libraries, containing thousands of spectra, can be searched to find a match having a Raman spectrum for a given material or product being measured, to thereby identity the given product material or product.

Analyzers implementing Raman spectroscopy currently exist for identifying raw materials and products. For example, Thermo Fisher Scientific Inc. provides a Raman-based handheld analyzer identifiable as the TruScan™ RM Handheld Raman Analyzer. However, the use of such existing scanners can be problematic because of variance in the scans of materials and/or products, such as pharmaceutical and biotechnology materials or products, especially those having similar Raman spectra. For example, variance among Raman spectra of similar products may cause an existing Raman-based handheld analyzer to incorrectly identify, e.g., by outputting a Type I Error (false positive) or Type II error (false negative) for, a pharmaceutical or biotechnology product. A major source of variance or error originates from differences among the Raman-based analyzers, including differences such as variability in any of the software, manufacture, age, component(s), operating environment (e.g., temperature), or other such differences of the Raman-based analyzers.

Known approaches typically fail to address the error caused by the variance or variability among handheld analyzers. For example, in one known approach, data from several analyzers may be used to develop a static mathematical equation for use across several analyzers. Generally, however, the difficulty with this approach is that instrument performance may vary over time. Many times, it is also impractical or impossible to have routine access to all of these instruments. In particular, the data for construction of the static mathematical equation is generally not available, especially for new analyzers, where a manufacturer may not provide new specifications for new analyzers in advance. This prevents the development and maintenance of the static mathematical equation, especially as such new analyzers are developed over time, and given that the development of a static mathematical equation typically requires a large number of samples for different analyzer types to be accurate. Moreover, without such new specifications for new analyzers, the static mathematical equation may not be compatible when executing the static mathematical equation on new analyzers. In addition, differences in the manufacturing or quality control of analyzers, especially among different manufacturers, for example, causes the static mathematical equation to become over tolerant as to variability, thereby creating a static mathematical equation that itself that is too variable for accurate measurement and/or identification of biological products.

In a second known approach, the data from a given analyzer is standardized, where a child-to-parent instrument map is created for a given group of analyzers. This approach, however, is limited because construction of a child-to-parent instrument map generally requires data from both parent and child instruments, which is typically difficult and/or computationally costly to implement or maintain, especially over longer periods of time as new generations of analyzers are developed, thereby requiring numerous permutations and types of child-to-parent instrument maps. In addition, with respect to the biopharmaceutical industry, user access to the child instruments is restricted, which also limits the child-to-parent instrument map approach.

In a third known approach, data from a given analyzer is also standardized, but where the variability among analyzers is ignored or treated as trivial. Such an approach is not, however, desirable given that analyzer-to-analyzer variability typically impacts accurate identification and measurement of raw material and/or biological products, and, should, therefore be taken into account.

For the foregoing reasons, there is a need for configurable handheld biological analyzers, and related methods, for identification of biological products based on Raman spectroscopy, which are configured to reduce variability, and increase compatibility, among similarly configured, configurable handheld biological analyzers.

SUMMARY

The disclosure of the present application describes use of Raman spectroscopy, via handheld analyzer(s), for identification of biological products. Moreover, the disclosure of the present specification describes the use of configurable handheld biological analyzers, systems, and methods to overcome limitations generally associated with known methods of using Raman spectra to measure biological products. For example, the Raman spectra among certain biological products can be too similar to distinguish with known methods of using Raman spectra, which typically depend on generalized statistical algorithms. Raman spectra measurements can be especially problematic when instrument-to-instrument variability is introduced, causing, for example, Type I and Type II errors among the various analyzers. As described herein, such variability can be caused by any one or more of differences in software, manufacture, age, components, operating environment (e.g., temperature), or other differences of Raman-based analyzers. This problem manifests itself especially during the development or manufacture of biological products, because analyzer-to-analyzer variability can be key factor affecting quality, robustness, and/or transferability in a manufacturing or development process related to a pharmaceutical or biological product. Accordingly, in various embodiments disclosed herein, configurable handheld biological analyzers are described, for example, that use configurations that use specific preprocessing algorithms and/or multivariate data analysis to (1) ensure that measurement and/or identification of materials or products is sensitive and/or specific, and (2) ensure the compatibility and configuration, as developed on a first set of analyzers, is transferable and/or implementable to additional analyzers, such as new analyzers within a "network" or group of analyzers.

Accordingly, in various embodiments herein, a configurable handheld biological analyzer for identification of biological products based on Raman spectroscopy is disclosed. The configurable handheld biological analyzer may comprise a first housing adapted for handheld manipulation. In addition, the configurable handheld biological analyzer may comprise a first scanner carried by the first housing. The configurable handheld biological analyzer may include a first processor communicatively coupled to the first scanner. The configurable handheld biological analyzer may further include a first computer memory communicatively coupled to the first processor. In various embodiments, the first computer memory may be configured to load a biological classification model configuration. The biological classification model configuration may include a biological classification model. The biological classification model may be configured to execute on the first processor. The first processor may be configured to (1) receive a first Raman-based spectra dataset defining a first biological product sample as scanned by the first scanner, and (2) identify, with the biological classification model, a biological product type based on the first Raman-based spectra dataset. The biological classification model configuration may include a spectral preprocessing algorithm. The first processor may be configured to execute the spectral preprocessing algorithm to reduce a spectral variance of the first Raman-based spectra dataset when the first Raman-based spectra dataset is received by the first processor. In addition, the biological classification model may comprise a classification component selected to reduce at least one of (1) a Q-residual error of the biological classification model, or (2) a summary-of-fit value of the biological classification model, the biological classification model configured to identify the biological product type of the first biological product sample based on the classification component.

In additional embodiments disclosed herein, a biological analytics method for identification of biological products based on Raman spectroscopy is disclosed. The biological analytics method may include loading, into a first computer memory of a first configurable handheld biological analyzer having a first processor and a first scanner, a biological classification model configuration. The biological classification model configuration may include a biological classification model. In addition, the biological analytics method may include receiving, by the biological classification model, a first Raman-based spectra dataset defining a first biological product sample as scanned by the first scanner. Further, the biological analytics method may include executing a spectral preprocessing algorithm of the biological classification model to reduce a spectral variance of the first Raman-based spectra dataset. Still further, the biological analytics method may include identifying, with the biological classification model, a biological product type based on the first Raman-based spectra dataset. The biological classification model may comprise a classification component selected to reduce at least one of (1) a Q-residual error of the biological classification model, or (2) a summary-of-fit value of the biological classification model, the biological classification model configured to identify the biological product type of the first biological product sample based on the classification component.

In still further additional embodiments disclosed herein, tangible, non-transitory computer-readable medium (e.g., a computer memory) storing instructions for identification of biological products based on Raman spectroscopy is described. The instructions, when executed by one or more processors of a configurable handheld biological analyzer, cause the one or more processors of the configurable handheld biological analyzer to load, into a computer memory of the configurable handheld biological analyzer having a scanner, a biological classification model configuration. The biological classification model configuration may include a biological classification model. The biological classification model may receive a Raman-based spectra dataset defining a biological product sample as scanned by the scanner. In addition, the one or more processors of a configurable handheld biological analyzer may execute a spectral preprocessing algorithm of the biological classification model to reduce a spectral variance of the Raman-based spectra dataset. The one or more processors of a configurable handheld biological analyzer may identify, with the biological classification model, a biological product type based on the Raman-based spectra dataset. As described in various embodiments, the biological classification model may comprise a classification component selected to reduce at least one of (1) a Q-residual error of the biological classification model, or (2) a summary-of-fit value of the biological classification model. The biological classification model may be configured to identify the biological product type of the biological product sample based on the classification component.

Benefits of the present application include development of biological classification model(s) (e.g., multivariate analysis model(s)) that yield consistent results for a same pharmaceutical or biological product (e.g., therapeutic products/drugs) across different analyzers, including different analyzers used to scan Raman-based datasets used to construct the biological classification model. As described herein, multiple analyzers, or multiple datasets of Raman spectra generated by such analyzers, may be used to construct the biological classification model.

Further, as described herein, the biological classification models are configurable and transferable among configurable handheld biological analyzers and may comprise Raman spectral preprocessing, classification component selection (e.g., via singular value decomposition (SVD) analysis), and discriminating statistical analysis to reduce variability among configurable handheld biological analyzers. For example, use of the biological classification model, as described herein, improves over existing analyzers because it reduces variability among instruments/analyzers, requires no data from child instruments to develop, and may be used across different analyzers implementing different software, having different software or software versions, having different manufactures, ages, operating environments (e.g., temperatures), components, or other such differences.

In various embodiments, Q-residuals may be used as a discriminating statistic to determine which biological classification models are tolerant of analyzer-to-analyzer variability. This can provide an indication of which biological classification model(s) to select for loading into a configurable handheld biological analyzers.

Moreover, a biological classification model's accuracy may be increased by applying preprocessing techniques (e.g., spectral preprocessing algorithms, as described herein) to minimize statistical Type I and/or Type II error of the biological classification model's output, and, therefore improve the output the configurable handheld biological analyzer(s), on which the biological classification model is installed/configured.

In addition, in some embodiments, configurable handheld biological analyzer(s) may use multivariate analysis (e.g., Principal Component Analysis (PCA)) to determine a classification component for a biological classification model. This allows for the configurable handheld biological analyzers to distinguish biological products/drugs having similar formulations. This provides a flexible approach, as biological classification models may be generated with various, different, and/or additional classification components (e.g., a second principal component of the PCA biological classification model) to correspond to products having multiple specifications (e.g., products regarding denosumab).

In accordance with the above, and with the disclosure herein, the present disclosure includes improvements in computer functionality or in improvements to other technologies at least because the claims recite, e.g., configurable handheld biological analyzer for identification of biological products based on Raman spectroscopy, which are improvements to existing handheld biological analyzers. That is, the present disclosure describes improvements in the functioning of the computer itself or "any other technology or technical field" because the configurable handheld biological analyzers are computing devices, as described herein, and provide, via their biological classification model configurations, reduced analyzer-to-analyzer variability when compared with existing handheld biological analyzers. This improves over the prior art at least because the configurable handheld biological analyzers described herein provide increased accuracy with respect to measurement, identification, and/or classification of materials and/or products (e.g., therapeutic products), which is important feature in the manufacture and development of pharmaceutical and/or other such biological products.

In addition, configurable handheld biological analyzers, as described herein, are further improved by use of the biological classification model configuration, which is transferable, optionally updatable (with new data), and loadable into a memory of compatible configurable handheld biological analyzer(s), which allows for standardization, and thereby reduced variability, among a set (i.e., a "network") of analyzers. This reduces the maintenance and/or time of deployment for the configurable handheld biological analyzers for the analyzer network.

In addition, the configurable handheld biological analyzer is further improved by use of the biological classification model configuration, which includes a biological classification model. The biological classification model improves the accuracy of identification and/or classification of biological products by eliminating or reducing Type I error (e.g., false positives) and/or Type II error (e.g., false negatives), as described herein.

In addition, the present disclosure includes applying the certain of the claim elements with, or by use of, a particular machine, e.g., a configurable handheld biological analyzer for identification of biological products based on Raman spectroscopy, including identification of biological products during development or manufacture of such products.

Moreover, the present disclosure includes effecting a transformation or reduction of a particular article to a different state or thing, e.g., transforming or reducing a Raman spectra dataset to different state used for identification of biological products based on Raman spectroscopy.

The present disclosure includes specific features other than what is well-understood, routine, conventional activity in the field, or adding unconventional steps that confine the claim to a particular useful application, e.g., including providing a biological classification model configuration used for reducing variability among a set (i.e., "network") of configurable handheld biological analyzers that may each be used for identification of biological products based on Raman spectroscopy.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 4B illustrates an example visualization of summary-of-fit values (e.g., Hotelling T^2 Values) of a biological classification model.

FIGS. 6A to 6C illustrate an example computer program listing that includes pseudo code of a biological classification model configuration, in accordance with various embodiments disclosed herein.

FIGS. 8A-8D each illustrate example visualizations of reduced Q-residual errors for a target product as evaluated for eighteen different configurable handheld biological analyzers, in accordance with various embodiments described herein.

The Figures depict preferred embodiments for purposes of illustration only. Alternative embodiments of the systems and methods illustrated herein may be employed without departing from the principles of the invention described herein.

DETAILED DESCRIPTION

Figure 1:
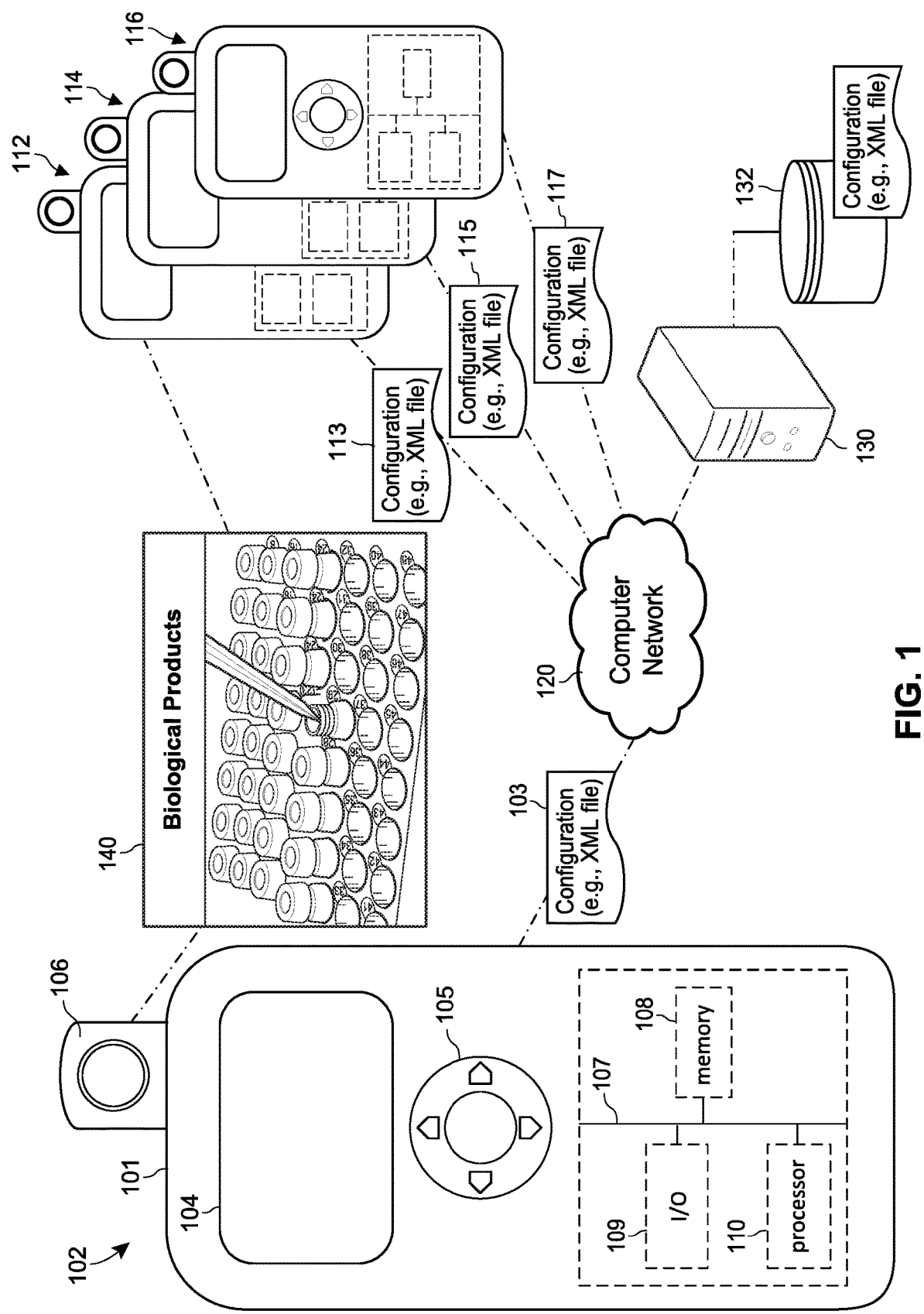
FIG. 1 illustrates an example configurable handheld biological analyzer for identification of biological products based on Raman spectroscopy, in accordance with various embodiments disclosed herein.

FIG. 1 illustrates an example configurable handheld biological analyzer 102 for identification of biological products 140 based on Raman spectroscopy, in accordance with various embodiments disclosed herein. In the embodiment of FIG. 1, configurable handheld biological analyzer 102 includes first housing 101 molded or otherwise adapted for handheld manipulation. In addition, configurable handheld biological analyzer 102 includes first scanner 106 carried by (e.g., such as coupled to or connected to, directly or indirectly) the first housing. Configurable handheld biological analyzer 102 also includes first processor 110 communicatively coupled to first scanner 106. Configurable handheld biological analyzer 102 may further include first computer memory 108 communicatively coupled to first processor 110. In addition, configurable handheld biological analyzer 102 may include input/output (I/O) component 109 for receiving input from navigation wheel 105. For example, a user may manipulate navigation wheel 105 to select or scroll data or information of a particular sample of a biological product, e.g., as scanned from scanning biological products 140. Input/output (I/O) component 109 may also control display of measurement, identification, classification, or other information as described herein on display screen 104. Each of display screen 104, navigation wheel 105, first scanner 106, first computer memory 108, I/O component 109, and/or first processor 110 are communicatively coupled via electronic bus 107 that is configured to send and/or receive electronic signals (e.g., control signals) or information among the various components, including 104 to 110. In some embodiments, configurable handheld biological analyzer 102 may be a Raman-based handheld analyzer, such as a TruScan™ RM Handheld Raman Analyzer as provided by Thermo Fisher Scientific Inc.

In various embodiments, first computer memory 108 is configured to load a biological classification model configuration, e.g., biological classification model configuration 103. Biological classification model configuration 103 may be used to implement the biological analytics method of FIG. 2 for identification of biological products based on Raman spectroscopy, as described further herein.

In the embodiment of FIG. 1, biological classification model configuration 103 is implemented as an extensible markup language (XML) file in an XML format. As described in various embodiments herein, FIGS. 6A to 6C illustrate an example computer program listing that includes pseudo code of a biological classification model configuration (e.g., biological classification model configuration 103) in XML format. In the embodiment computer program listing of FIGS. 6A to 6C, for example, at Code Section 1, biological classification model configuration 103 is formatted in XML, where a biological classification model ("<model>") is defined within biological classification model configuration 103. Biological classification model configuration 103 is transferrable, installable, and/or otherwise implementable or executable on similarly configured configurable handheld biological analyzers (e.g., configurable handheld biological analyzers 112, 114, and/or 116). Each of configurable handheld biological analyzers 112, 114, and 116 comprise the same components as configurable handheld biological analyzer 102 such that the disclosure for configurable handheld biological analyzer 102 applies equally to each of configurable handheld biological analyzers 112, 114, and 116. Each of configurable handheld biological analyzers 102, 112, 114, and 116 may be part of a same analyzer group or set (i.e., comprising an analyzer "network" or group). In some embodiments, each of configurable handheld biological analyzers 102, 112, 114, and/or 116 may have a same, similar, and/or different mix of characteristics or features, such as a same, similar, and/or different mix of software version(s) or type(s), manufacture(s), age(s), operating environment(s) (e.g., temperature), component(s), or other such similarities or differences of Raman-based analyzers.

Regardless of the same, similar, and/or different mix of characteristics or features among configurable handheld biological analyzers 102, 112, 114, and 116, biological classification model configuration 103, and its related biological classification model, allows for the network of configurable handheld biological analyzers (e.g., configurable handheld biological analyzers 102, 112, 114, and 116) to yield consistent results when measuring or identifying pharmaceutical or biological product (e.g., therapeutic products/ drugs). That is, despite the similarities or differences of a given analyzer network of configurable handheld biological analyzers, such configurable handheld biological analyzers may accurately identify or measure a given pharmaceutical or biological product when such configurable handheld biological analyzers are configured with a biological classification model configuration as describe herein.

In various embodiments, multiple analyzers may be used to generate or construct a biological classification model configuration 103 and its related biological classification model. For example, in some embodiments, any one or more of configurable handheld biological analyzers 102, 112, 114, and 116, and/or other analyzers (not shown) may be used to generate or construct a biological classification model.

Generation of a biological classification model configuration 103, and its related biological classification model, generally requires a group or network of analyzers scanning samples (e.g., of biological products 140) to produce Raman-based spectra datasets of those samples. For example, scanning biological products 140, e.g., by any of configurable handheld biological analyzers 102, 112, 114, and 116, can yield detailed information regarding biological products 140. For example, the detailed information can include Raman-based spectra dataset(s) defining a biological product sample(s) (e.g., of biological products 140). Examples of biological products 140 may include any of denosumab DP, panitumumab DP, etanercept DP, pegfilgrastim DP, romosozumab DP, adalimumab DS, and/or erenumab DP, as described herein (such as romosozumab DP, adalimumab DS, and/or erenumab DP). However, it is to be understood that additional biological products are contemplated herein, and biological products 140 are not limited to any specific biological product or grouping thereof.

In some embodiments, configurable handheld biological analyzer 102 may define instrument or analyzer-based spectral acquisition parameters (e.g., integration time, laser power, etc.) to be used for scanning samples, e.g., of biological products 140. For example, a user, via navigation wheel 105 may select the spectral acquisition parameters to use of scanning a sample. In some embodiments, configurable handheld biological analyzer 102 may generate an output file (e.g., an output file of the ".acq" file type) that specifies the spectral acquisition parameters.

In some embodiments, a configurable handheld biological analyzer (e.g., configurable handheld biological analyzer 102) may load an output file (e.g., an ".acq" file) to configure the configurable handheld biological analyzer with the spectral acquisition parameters to use for scanning a target product. As described herein, Raman-based spectra dataset(s) may be scanned, by one or more configurable handheld biological analyzer(s) (e.g., configurable handheld biological analyzer 102), in order to generate a biological classification model configuration (e.g., biological classification model configuration 103). In some embodiments, sample(s) (e.g., multiple lots) of a biological product (e.g., of biological products 140) may be selected as a representative target product for scanning. Generally, a "target product," as described herein, represents a biological product used to train or otherwise configure a biological classification model configuration and its related model. Generally, a target product is selected based on its biological specifications. Once setup with the spectral acquisition parameters to use for scanning a target product, a configurable handheld biological analyzer (e.g., configurable handheld biological analyzer 102) may scan (e.g., with first scanner 106) samples of the target product, in some cases multiple times (e.g., fourteen (14) times)), where each scan generates detailed information, including Raman-based spectra dataset(s) of the target product.

In a similar embodiment, multiple configurable handheld biological analyzers (configurable handheld biological analyzers 102, 112, 114, and/or 116)) may load the output file (e.g., ".acq" file) to setup each configurable handheld biological analyzer with the spectral acquisition parameters to use for scanning biological product samples. Once setup, each configurable handheld biological analyzer (e.g., any of configurable handheld biological analyzers 102, 112, 114, and/or 116) is configured to scan (e.g., with first scanner 106) the samples, in some cases multiple times (e.g., fourteen (14) times)), where each scan generates detailed information, including Raman-based spectra dataset(s), of the target product. By scanning a given target product with different/multiple scanners, the Raman-based spectra dataset(s) captured by those scanners become robust in that the Raman-based spectra dataset(s) capture any differences (e.g., caused by software, manufacture, age, operating environment (e.g., temperature), etc.) among the scanners. In this way, the Raman-based spectra dataset(s) provide an ideal training dataset for reducing variability among the multiple scanners as described herein. Each of the Raman-based spectra dataset(s), e.g., as scanned by the multiple scanners (e.g., any of configurable handheld biological analyzers 102, 112, 114, and/or 116) may be output and/or saved as a Raman spectrum file, for example, having a ".spc" file type.

It is to be understood that Raman-based spectra dataset(s) may also be captured for a challenge product in the same or similar manner as for a target product. As used herein, a "challenge product" describes a biological product (e.g., selected from biological products 140) that a configurable handheld biological analyzer (e.g., configurable handheld biological analyzer 102) is configured to identify, classify, or measure, when loaded or otherwise configured with a biological classification model configuration (e.g., biological classification model configuration 103) and its related biological classification model, as described herein.

Raman-based spectra dataset(s) for a challenge product may be captured in the same/or similar manner as for a target product, where a challenge product may be selected based on its biological specifications and where the a configurable handheld biological analyzer (e.g., configurable handheld biological analyzer 102) may load an output file (e.g., ".acq" file) to configure the configurable handheld biological analyzer with the spectral acquisition parameters to use for scanning the challenge product. Once setup, the configurable handheld biological analyzer (e.g., configurable handheld biological analyzer 102) is configured to scan (e.g., with first scanner 106) the samples of the challenge product, in some cases multiple times (e.g., three (3) times)), where each scan generates detailed information, including Raman-based spectra dataset(s) of the challenge product. The Raman-based spectra dataset(s), e.g., as scanned by the configurable handheld biological analyzer 102, may be output and/or saved as a Raman spectrum file, for example, having a ".spc" file type.

In some embodiments, generation of a biological classification model configuration (e.g., biological classification model configuration 103) may be performed by a remote processor, such as a processor of computer 130 illustrated by FIG. 1. For example, Raman-based spectra dataset(s), as generated for a biological product (e.g., selected from biological products 140) as describe herein, may be imported into and/or analyzed by modeling software, executing on computer 130, configured to analyze Raman-based spectra dataset(s). One example of such modeling software includes SOLO (stand-alone chemo-metrics software) as provided by Eigenvector Research, Inc. However, it is to be understood that other modeling software, including custom or proprietary software, implemented to perform the features described herein may also be used. The modeling software may build or generate a biological classification model based on the Raman-based spectra dataset(s). For example, in some embodiments, Raman-based spectra dataset(s) as scanned or captured for target product(s), as described herein, may be used to build or generate a biological classification model. Still further, Raman-based spectra dataset(s) (e.g., for a target product or a challenge product) may also be used for cross validation of the biological classification model. For example, Raman-based spectra dataset(s) may be used to evaluate Type I error (e.g., false positives) and II error (e.g., false negatives) of a biological classification model against cross validation data set of Raman-based spectra dataset(s).

In various embodiments, biological classification model, and/or its related biological classification model configuration (e.g., biological classification model configuration 103), may be generated to include algorithms (e.g., scripts) and parameters to be used by a configurable handheld biological analyzer (e.g., configurable handheld biological analyzer 102) to identify, classify, and/or measure biological products as described herein. Examples of the algorithms (e.g., scripts) and/or parameters are described with respect to FIGS. 2, 6A, and 6B herein. For example, a biological classification model configuration (e.g., biological classification model configuration 103) may include parameters defining details of the biological classification model. For example, such parameters may conclude the number of classification components of the biological classification model, loadings, etc.. For example, in one embodiment, the number of classification components may be determined, e.g., by modeling software, through singular value decomposition (SVD) analysis where the classification components comprise one or more principal components of a PCA. The modeling software may be configured to set statistical confidence levels to determine the classification components (e.g., principal components) for inclusion in the biological classification model. For example, in the embodiment computer program listing of FIGS. 6A to 6C, at Code Section 1, the biological classification model configuration indicates that the biological classification model (e.g., the defined "<model>") is a PCA type of biological classification model. This indicates that the classification components of the biological classification model will be principal components. For example, in the embodiment of FIGS. 6A to 6C, Code Section 2 indicates the number of principal components is to be one (single) principal component ("Num. PCs: 1") that is to be determined via an SVD analysis ("Algorithm: SVD") to be executed, for example, on first processor 110 of configurable handheld biological analyzer 102.

Figure 3A:
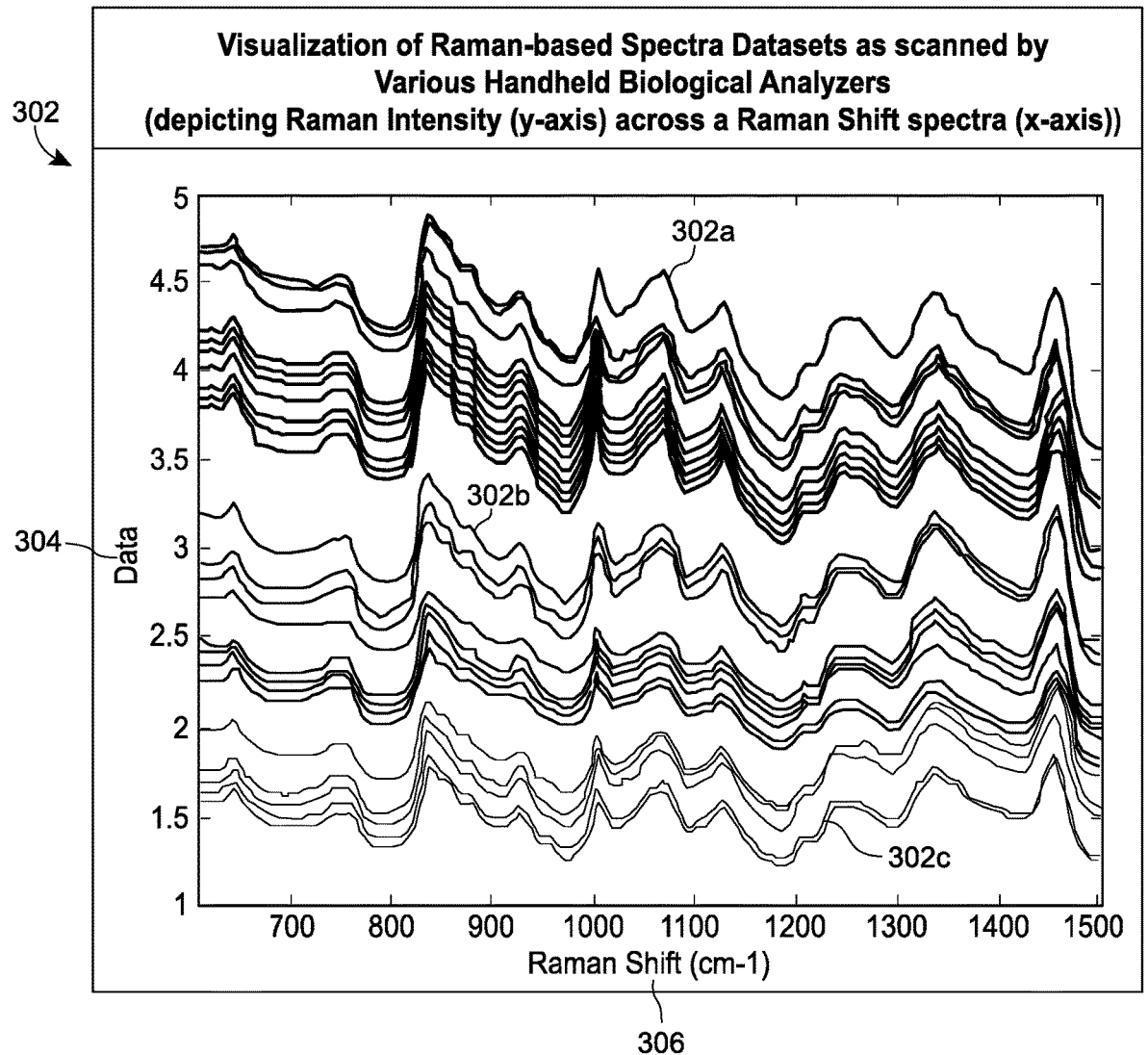
FIG. 3A illustrates an example visualization of Raman-based spectra datasets as scanned by various handheld biological analyzers, in accordance with various embodiments disclosed herein.
Figure 3B:
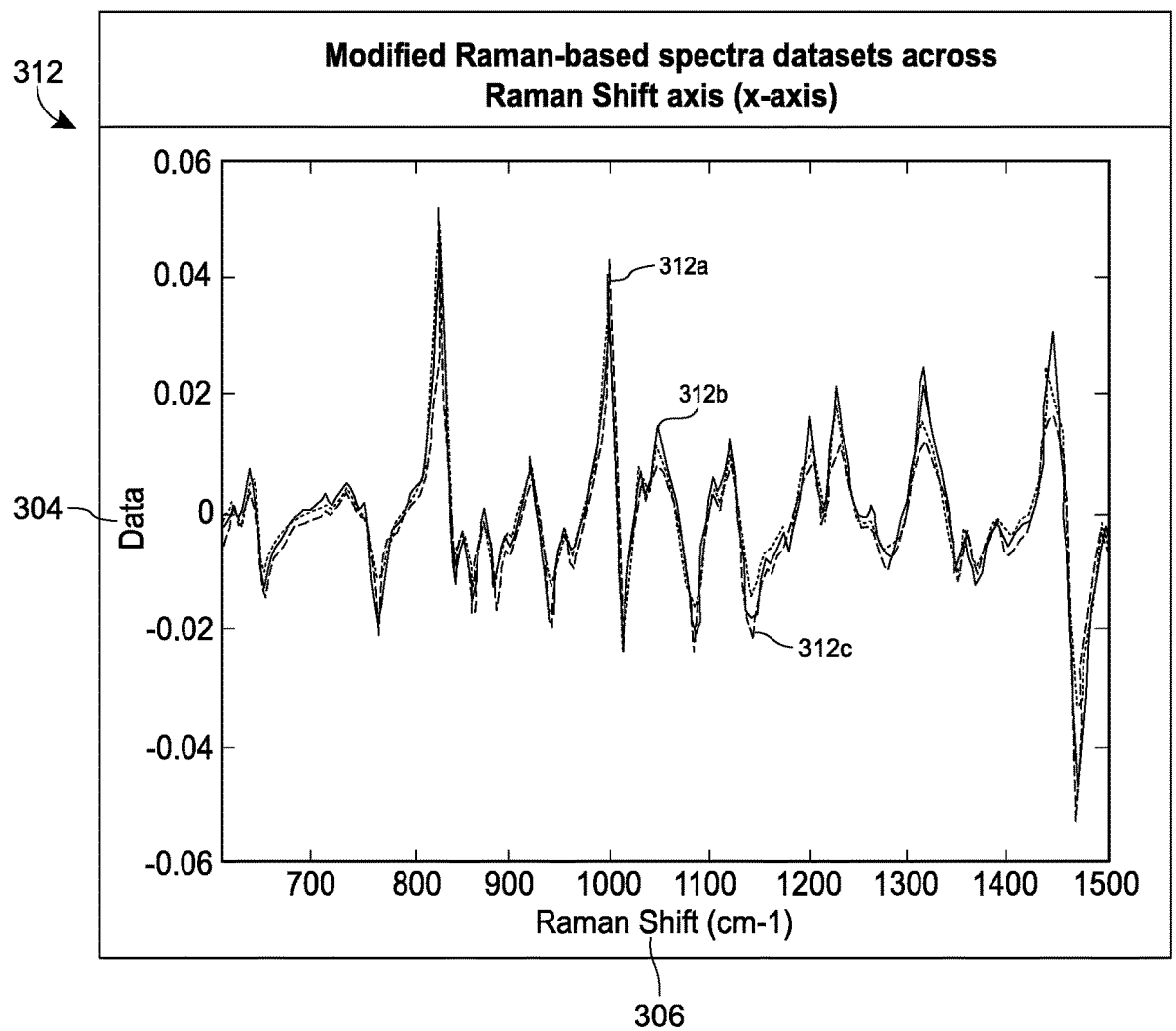
FIG. 3B illustrates an example visualization of modified Raman-based spectra datasets as modified from the Raman-based spectra datasets of FIG. 3A.
Figure 3C:
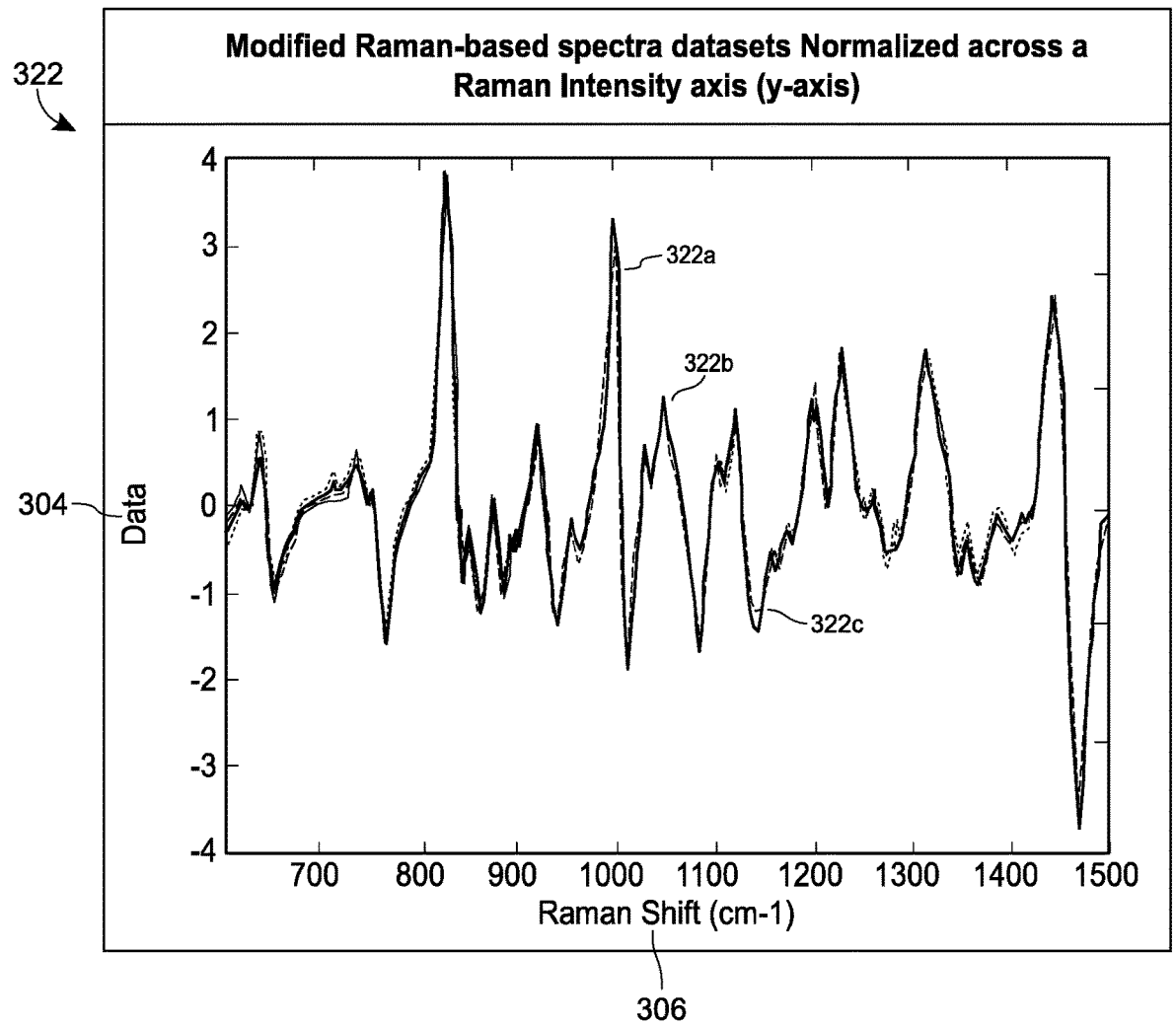
FIG. 3C illustrates an example visualization of normalized Raman-based spectra datasets as a normalized version of the modified Raman-based spectra datasets of FIG. 3B.

As a further example, a biological classification model configuration (e.g., biological classification model configuration 103) may include computer code or scripts for defining or implementing spectral preprocessing algorithm(s), for example, as described with respect to FIGS. 3A to 3C. Generally, the computer code or scripts for defining or implementing spectral preprocessing algorithm(s) may be executed on a processor (e.g., first processor 110), where the processor receives Raman-based spectra dataset(s) of biological products (e.g., biological products 140). The configurable handheld biological analyzer then executes the computer code or scripts defining or implementing spectral preprocessing algorithm(s) to prepare/preprocess the data for input into classification component(s) of the biological classification model in order to identify, measure, or classify a biological product (e.g., a challenge product) as described herein. For example, in the embodiment computer program listing of FIGS. 6A to 6C, at Code Section 2, the biological classification model configuration includes an execution sequence of an example spectral preprocessing algorithm (e.g., "Preprocessing: 1st Derivative (order: 2, window: 21 pt, incl only, tails: polyinterp), SNV, Mean Center"), which includes determining a first derivative, applying a standard normal variate (SNV) algorithm, and further applying a meaning centering function to a Raman-based spectra dataset scanned for a particular product (e.g., target product or challenge product). An example embodiment of this execution sequence is described and visualized herein with respect to FIGS. 3A to 3C and Code Sections 4 to 6 of FIGS. 6A to 6C.

As a further example, a biological classification model configuration (e.g., biological classification model configuration 103) may include the Raman-based spectra dataset(s) used to generate the biological classification model. For example, in the embodiment computer program listing of FIGS. 6A to 6C, at Code Section 3, the biological classification model configuration (e.g., biological classification model configuration 103) includes example Raman-based spectra dataset(s) used to generate the biological classification model of FIGS. 6A to 6C.

In some embodiments, the biological classification model configuration (.e.g., biological classification model configuration 103) may also define threshold values, for example as statistical acceptance criteria, to determine whether a biological product has been successfully identified or measured by a configurable handheld biological analyzer 102. For example, such threshold values may define pass/fail thresholds for Q-residuals or Hotelling $T^2$ values (as described herein) to determine whether a biological product has been successfully identified or measured by configurable handheld biological analyzer 102. In other embodiments, the threshold values may be configured independently from the biological classification model configuration (.e.g., biological classification model configuration 103), for example, by the user configuring and/or defining the threshold values manually via the navigation wheel 105 and display screen 104 described herein.

Once generated, a biological classification model and its related biological classification model configuration (e.g., biological classification model configuration 103) may be exported to a file (e.g., an XML file, as described herein) for transmission (e.g., via computer network 120 or otherwise described herein) to, and/or for loading into the memory of, configurable handheld biological analyzers (e.g., any one or more of configurable handheld biological analyzers 102, 112, 114, and/or 116) as described herein. In some embodiments, output file(s) (e.g., an ".acq" file as describe herein), may also be transmitted to (e.g., via computer network 120 or otherwise described herein), and/or loaded into the memory of, configurable handheld biological analyzers (e.g., any one or more of configurable handheld biological analyzers 102, 112, 114, and/or 116).

A biological classification model may be generated by a remote processor that is remote to a given configurable handheld biological analyzer. For example, in the embodiment of FIG. 1, computer 130 incudes a remote processor that is remote to configurable handheld biological analyzer 102. Computer 130 may generate (e.g., as described herein) and store one or more biological classification model configuration(s) and/or biological classification models in database 132. In various embodiments, computer 130 may transfer, over computer network 120, biological classification model configuration(s) (e.g., any of biological classification model configurations 103, 113, 115, and/or 117) to a configurable handheld biological analyzers (e.g., to configurable handheld biological analyzers 102, 112, 114, and/or 116, respectively). In some embodiments, each of biological classification model configurations 103, 113, 115, and/or 117 may be copies of a same file (e.g., same XML file). Computer network 120 may comprise a wired and/or wireless (e.g., 802.11 standard network) implementing a computer packet protocol, such as, for example transmission control protocol (TCP)/internet protocol (IP). In other embodiments, a biological classification model configuration (e.g., biological classification model configuration 103) may be transferred via a universal serial bus (USB) cable (not shown), memory drive (e.g., a flash or thumb drive) (not shown), a disk (not shown), or other transfer or memory device cable of transferring a data file, such as the XML file disclosed herein. In still further embodiments, biological classification model configuration 103 may be transferred via a wireless standard or protocol, such as Bluetooth, WiFi, or a cellular standard, such as GSM, EDGE, CDMA, and the like.

A biological classification model configuration (e.g., biological classification model configuration 103) may be transferred among configurable handheld biological analyzers. Once transferred, a biological classification model configuration may be loaded into the memory of a configurable handheld biological analyzer to calibrate or configure that configurable handheld biological analyzer to have a reduced variability with respect to other configurable handheld biological analyzers implementing or executing the biological classification model. For example, in one embodiment, biological classification model configuration 103 may include a biological classification model. The biological classification model of biological classification model configuration 103 may be configured to execute on first processor 110. For example, first processor 110 may be configured to (1) receive a first Raman-based spectra dataset defining a first biological product sample (e.g., of scanning biological products 140) as scanned by the first scanner, and (2) identify, with the biological classification model, a biological product type based on the first Raman-based spectra dataset. For example, in some embodiments, the biological product type may be of a therapeutic product having a therapeutic product type.

The biological classification model of biological classification model configuration 103 may be electronically transferred, e.g., via biological classification model configuration 113 over computer network 120 to configurable handheld biological analyzer 112. Just as for configurable handheld biological analyzer 102, configurable handheld biological analyzer 112 may comprise a second housing adapted for handheld manipulation, a second scanner coupled to the second housing, a second processor communicatively coupled to the second scanner, and a second computer memory communicatively coupled to the second processor. The second computer memory of configurable handheld biological analyzers 112 is configured to load the biological classification model configuration 113. Biological classification model configuration 113 includes the biological classification model of biological classification model configuration 103. When implemented or executed on the second processor of configurable handheld biological analyzer 112, the second processor is configured to (1) receive a second Raman-based spectra dataset defining a second biological product sample (e.g., taken from scanning biological products 140) as scanned by the second scanner of configurable handheld biological analyzer 112, and (2) identify, with the biological classification model, the biological product type based on the second Raman-based spectra dataset. In such embodiments, the same biological product or product type is identified, by use of the same biological classification model, as transferred by the biological classification model configuration files, where the second biological product sample is a new sample of the biological product type (e.g., the same biological product type as analyzed by the first configurable handheld biological analyzer 102).

In various embodiments, new or additional Raman-based spectra dataset(s) may be scanned by configurable handheld biological analyzers and used to update a biological classification model. In such embodiments, an updated biological classification model may be transferred to a configurable handheld biological analyzer (e.g., configurable handheld biological analyzer 102) as described herein.

In some embodiments, the computer memory (e.g., first computer memory 108) of a configurable handheld biological analyzer (e.g., configurable handheld biological analyzer 102) may be configured to load a new biological classification model where the new biological classification model may comprise an updated classification component. The new classification component may be, for example, generate or determined for a new biological classification model as received with a new biological classification model configuration (e.g., biological classification model configuration 103).

As described in various embodiments herein, a configurable handheld biological analyzer (e.g., configurable handheld biological analyzer 102) may be configured by loading the logical classification model configuration, and its related biological classification model. Once configured, configurable handheld biological analyzer 102 may be used to identify, classify, or measure products of interest (e.g., challenge products and/or samples), as described herein.

Figure 2:
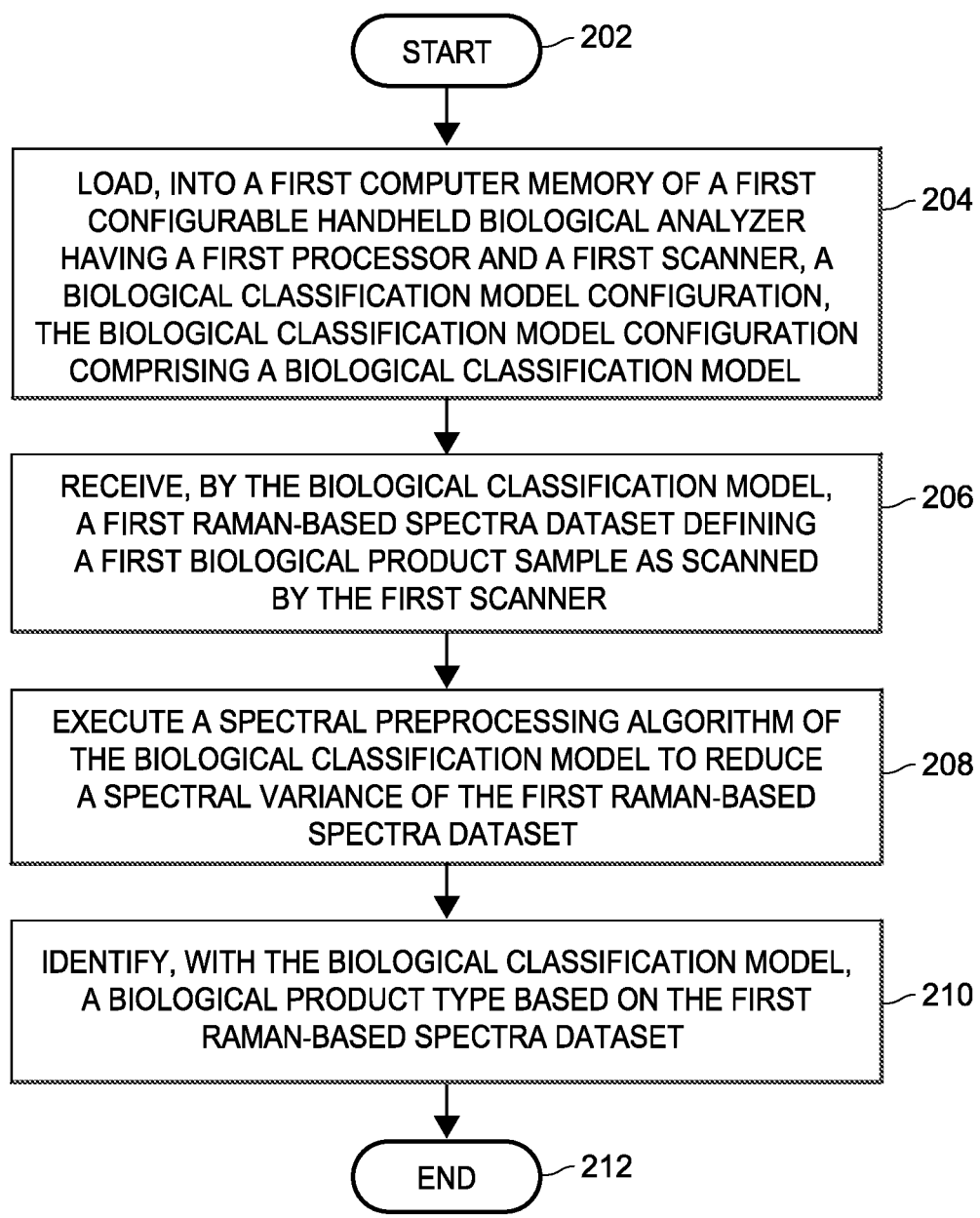
FIG. 2 illustrates an example flowchart of a biological analytics method for identification of biological products based on Raman spectroscopy, in accordance with various embodiments disclosed herein.

FIG. 2 illustrates an example flowchart of a biological analytics method 200 for identification of biological products (e.g., biological products 140) based on Raman spectroscopy, in accordance with various embodiments disclosed herein. Biological analytics method 200 begins (202) at block 204 with loading, into a first computer memory (e.g., first computer memory 108) of a first configurable handheld biological analyzer having a first processor (e.g., first processor 110) and a first scanner (e.g., first scanner 106), a biological classification model configuration (e.g., biological classification model configuration 103). In the embodiment of FIG. 2, the biological classification model configuration (e.g., biological classification model configuration 103) includes a biological classification model as described herein. In addition, in some embodiments, configurable handheld biological analyzer (e.g., configurable handheld biological analyzer 102) may load, e.g., into memory 108, spectral acquisition parameters (e.g., of an ".acq" file) to use for scanning product(s).

At block 206, biological analytics method 200 includes receiving, by the biological classification model (e.g., of biological classification model configuration 103), a first Raman-based spectra dataset defining a first biological product sample (e.g., selected from biological products 140) as scanned by the first scanner (e.g., first scanner 106).

At block 208, biological analytics method 200 includes executing, e.g., by a processor (e.g., first processor 110), a spectral preprocessing algorithm of the biological classification model to reduce a spectral variance of the first Raman-based spectra dataset. Spectral variance refers to an analyzer-to-analyzer spectral variance between the first Raman-based spectra dataset and one or more other Raman-based spectra datasets of one or more corresponding other handheld biological analyzers. For example, spectral variance may exist between a Raman-based spectra dataset scanned by configurable handheld biological analyzer 102 and Raman-based spectra dataset scanned by configurable handheld biological analyzer 112. The spectral variance may exist even though each of the Raman-based spectra datasets, as scanned by each of the analyzers, is representative of the same biological product type. Such spectral variance can be caused by analyzer-to-analyzer variability and/or differences, such as software, having differences in versions, manufacture, age, operating environment (e.g., temperature), components, or other differences of Raman-based analyzers as described herein.

The spectral preprocessing algorithm is configured to reduce the analyzer-to-analyzer spectral variance between the first Raman-based spectra dataset and the one or more other Raman-based spectra datasets. For example, in various embodiments, implementing or executing the spectral preprocessing algorithm (e.g., on first processor 110) minimizes statistical Type I (e.g., false positives) and/or Type II error (e.g., false negatives) associated with the identification of biological products (e.g., biological products 140). In various embodiments, the spectral preprocessing algorithm may reduce the analyzer-to-analyzer spectral variance among multiple configurable handheld biological analyzers (e.g., any of configurable handheld biological analyzers 102, 112, 114, and/or 116).

FIGS. 3A to 3C illustrate an example execution sequence of a spectral preprocessing algorithm of a configurable handheld biological analyzer (e.g., configurable handheld biological analyzer 102). Execution of the spectral preprocessing algorithm (e.g., by first processor 110) mitigates and lessens the impact of differences unique to each analyzer (e.g., configurable handheld biological analyzers 102, 112, 114, and/or 116) and reduces variance among Raman-based spectra datasets produced by scans of those analyzers. FIG. 3A illustrates visualization 302 of example Raman-based spectra datasets (e.g., including Raman-based spectra datasets 302a, 302b, and 302c) as scanned by one or more handheld biological analyzers, in accordance with various embodiments disclosed herein. The Raman-based spectra datasets of FIG. 3A may comprise Raman-based spectra datasets (e.g., including Raman-based spectra datasets 302a, 302b, and 302c) used to generate a biological classification model configuration (e.g., biological classification model configuration 103) and its related biological classification model as described herein. For example, the Raman-based spectra datasets of FIG. 3A may be those identified in Code Section 3 of FIG. 6A.

In some embodiments, each of the Raman-based spectra datasets of FIG. 3A (e.g., including Raman-based spectra datasets 302a, 302b, and 302c) may represent scans by different configurable handheld biological analyzers (e.g., any of configurable handheld biological analyzers 102, 112, 114, and/or 116). In other embodiments, however, each of the Raman-based spectra datasets of FIG. 3A (e.g., including Raman-based spectra datasets 302a, 302b, and 302c) may represent multiple scans of the same configurable handheld biological analyzer (e.g., configurable handheld biological analyzers 102).

FIG. 3A depicts several Raman-based spectra datasets (e.g., including Raman-based spectra datasets 302a, 302b, and 302c), visualized across Raman intensity values (on Raman intensity axis 304) and light wavelength/frequency values (on Raman shift axis 306). Raman intensity axis 304 indicates the intensity of scattered light at a given wavelength across Raman shift axis 306. Raman intensity axis 304 can show many photons, as scanned by an analyzer (e.g., configurable handheld biological analyzer 102), are scattered by a biological product sample (e.g., where a data/value of 3 is a relative measure of intensity of the photons measured/scanned by first scanner 106). Raman shift axis 306 indicates the wavenumber (e.g., an inverse wavelength) of the scattered light. The units of wavenumbers (i.e., number of waves per centimeter (cm), $cm^{-1}$) provide an indication of the frequency or wavelength difference between the incident and scattered light. In the visualization 302 of FIG. 3A, shift axis 306 includes a range of 600 to 1500 $cm^{-1}$. Raman intensity axis 304 includes a Raman intensity range of 1 to 5. As shown in FIG. 3A, each of Raman-based spectra datasets (e.g., including Raman-based spectra datasets 302a, 302b, and 302c) visualizes Raman intensity values measured across a light spectra range of 600 to 1500 $cm^{-1}$.

In addition, in various embodiments, each of the Raman-based spectra datasets of FIG. 3A (e.g., including Raman-based spectra datasets 302a, 302b, and 302c) may represent scans of the same biological product sample having the same biological product type. In such embodiments, as shown by FIG. 3A, even though any one or more of configurable handheld biological analyzer(s) may have scanned the same biological product sample having the same biological product type, variability exists in the Raman intensity values (on Raman intensity axis 304) of the Raman-based spectra datasets (e.g., including Raman-based spectra datasets 302a, 302b, and 302c) across the light wavelength/frequency values (on Raman shift axis 306). As described herein, the variability may have been caused by differences in software, manufacture, age, optical component(s), operating environment (e.g., temperature), or otherwise among the configurable handheld biological analyzers (e.g., any of configurable handheld biological analyzers 102, 112, 114, and/or 116).

FIG. 3B illustrates an example visualization 312 of modified Raman-based spectra datasets as modified from the Raman-based spectra datasets of FIG. 3A. For example, FIG. 3B may represent a first stage of an execution sequence of a spectral preprocessing algorithm. Visualization 312 of FIG. 3B includes the same Raman intensity axis 304 and Raman shift axis 306 as described herein for FIG. 3A. In the embodiment of FIG. 3B, a processor (e.g., first processor 110) applies a derivative transformation to the Raman-based spectra datasets of FIG. 3A (e.g., including Raman-based spectra datasets 302a, 302b, and 302c) to generate a modified Raman-based spectra datasets (e.g., including Raman-based spectra datasets 312a, 312b, and 312c) as depicted in FIG. 3B. Specifically, in the embodiment of FIG. 3B, a first derivative with 11 to 15 point data smoothing is applied (i.e., Raman weighted averages of consecutive groups of 11 to 15 Raman shift values are determined and then a first derivative transformation is applied to the groups). Said another way, the derivative transformation shown by FIG. 3B includes determining, by a processor (e.g., first processor 110), Raman weighted averages of consecutive groups of 11 to 15 Raman shift values (of Raman intensity axis 304) across the Raman shift axis 306, and then determining, by the processor (e.g., first processor 110) corresponding derivatives of those Raman weighted averages across Raman shift axis 306. Application of the derivative transformation mitigates impact of background curvature, e.g., due to Rayleigh scatter\rejection optics and/or other dispersive elements. This is shown graphically, by comparison of visualization 302 of FIG. 3A and visualization 312 of FIG. 3B, where the variance (e.g., vertical and/or horizontal variance) of Raman-based spectra datasets (e.g., including Raman-based spectra datasets 302a, 302b, and 302c, as shown in FIG. 3A) is removed or reduced to produce the less variable, modified Raman-based spectra datasets (e.g., including Raman-based spectra datasets 312a, 312b, and 312c) as depicted in FIG. 3B.

Application of the derivative transformation, as visualized by FIG. 3B, is further illustrated by computer program listing of FIGS. 6A to 6C. For example, in the embodiment computer program listing of FIGS. 6A to 6C, at Code Section 4, the biological classification model configuration includes a script, which is executable by first processor 110 of configurable handheld biological analyzer 102, which applies the derivative transformation algorithm, as described for FIG. 3B herein.

FIG. 3C illustrates an example visualization 322 of normalized Raman-based spectra datasets as a normalized version of the modified Raman-based spectra datasets of FIG. 3B. For example, FIG. 3C may represent a next stage or stages of the execution sequence of a spectral preprocessing algorithm. Visualization 322 of FIG. 3C includes the same Raman intensity axis 304 and Raman shift axis 306 as described herein for FIGS. 3A and 3B. For example, in one embodiment, the modified Raman-based spectra datasets (e.g., including Raman-based spectra datasets 312a, 312b, and 312c) as depicted in FIG. 3B, are aligned, by a processor (e.g., first processor 110) across Raman shift axis 306 to produce aligned Raman-based spectra datasets (e.g., including Raman-based spectra datasets 322a, 322b, and 322c) as depicted in FIG. 3C. Such alignment applies a correction for subtle y-axis shifts (i.e., of Raman intensity axis 304) caused by analyzer-to-analyzer variance/differences as described herein. Application of an alignment algorithm, as visualized by FIG. 3C, is further illustrated by computer program listing of FIGS. 6A to 6C. For example, in the embodiment computer program listing of FIGS. 6A to 6C, at Code Section 6, the biological classification model configuration (e.g., biological classification model configuration 103) includes a script, which is executable by first processor 110 of configurable handheld biological analyzer 102, applies a mean-centering algorithm that adjusts the alignment of the modified Raman-based spectra datasets (e.g., including Raman-based spectra datasets 312a, 312b, and 312c) as depicted in FIG. 3B to remove or reduce spectral variance (e.g., vertical and/or horizontal variance) of these modified Raman-based spectra datasets. This adjustment results in the aligned Raman-based spectra datasets (e.g., including Raman-based spectra datasets 322a, 322b, and 322c) as depicted in FIG. 3C.

Additionally, or alternatively, in another embodiment, the modified Raman-based spectra datasets (e.g., including Raman-based spectra datasets 312a, 312b, and 312c) as depicted in FIG. 3B, are normalized, by a processor (e.g., first processor 110) across Raman intensity axis 304 to produce aligned Raman-based spectra datasets (e.g., including Raman-based spectra datasets 322a, 322b, and 322c) as depicted in FIG. 3C. Such normalization applies a robust normalization algorithm to account for intensity-axis variation (i.e., variations in intensity values across Raman intensity axis 304) caused by analyzer-to-analyzer variance/ differences as described herein. Application of a normalization algorithm, as visualized by FIG. 3C, is further illustrated by computer program listing of FIGS. 6A to 6C. For example, in the embodiment computer program listing of FIGS. 6A to 6C, at Code Section 5, the biological classification model configuration includes a script, which is executable by first processor 110 of configurable handheld biological analyzer 102, that applies a normalization algorithm that normalizes the modified Raman-based spectra datasets (e.g., including Raman-based spectra datasets 312a, 312b, and 312c) as depicted in FIG. 3B to remove or reduce spectral variance (e.g., vertical and/or horizontal variance) of these modified Raman-based spectra datasets. This normalization results in normalized Raman-based spectra datasets (e.g., including Raman-based spectra datasets 322a, 322b, and 322c) as depicted in FIG. 3C. In particular, in the embodiment of FIGS. 6A to 6C, an standard normal variate (SNV) algorithm is applied, e.g., by first processor 110, to the modified Raman-based spectra datasets (e.g., including Raman-based spectra datasets 312a, 312b, and 312c) as depicted in FIG. 3B to produce aligned Raman-based spectra datasets (e.g., including Raman-based spectra datasets 322a, 322b, and 322c) as depicted in FIG. 3C.

Application of the alignment and/or normalization algorithms (e.g., as described for FIG. 3C) removes or reduces spectral variance of the modified Raman-based spectra datasets (e.g., including Raman-based spectra datasets 312a, 312b, and 312c) as depicted in FIG. 3B. This is shown graphically, by comparison of visualization 312 of FIG. 3B and visualization 322 of FIG. 3C, where the spectral variance (e.g., vertical and/or horizontal variance) of Raman-based spectra datasets (e.g., including Raman-based spectra datasets 312a, 312b, and 312c, as shown in FIG. 3B) is removed or reduced to produce the less variable, aligned and/or normalized Raman-based spectra datasets (e.g., including Raman-based spectra datasets 322a, 322b, and 322c) as depicted in FIG. 3C.

At block 210 of FIG. 2, biological analytics method 200 includes identifying or classifying, with the biological classification model, a biological product type based on the first Raman-based spectra dataset (e.g., the Raman-based spectra dataset as visualized and described for FIGS. 3A to 3C). For example, in various embodiments, once the execution sequence of a spectral preprocessing algorithm is executed (e.g., by first processor 110), e.g., as described herein with respect to FIGS. 3A to 3C and/or 6A to 6C, the preprocessed Raman-based datasets, e.g., aligned and/or normalized Raman-based spectra datasets (e.g., including Raman-based spectra datasets 322a, 322b, and 322c) as depicted in FIG. 3C, may be used by a configurable handheld biological analyzer (e.g., configurable handheld biological analyzer 102) to identify or classify biological products (e.g., biological products 140).

Figure 5:
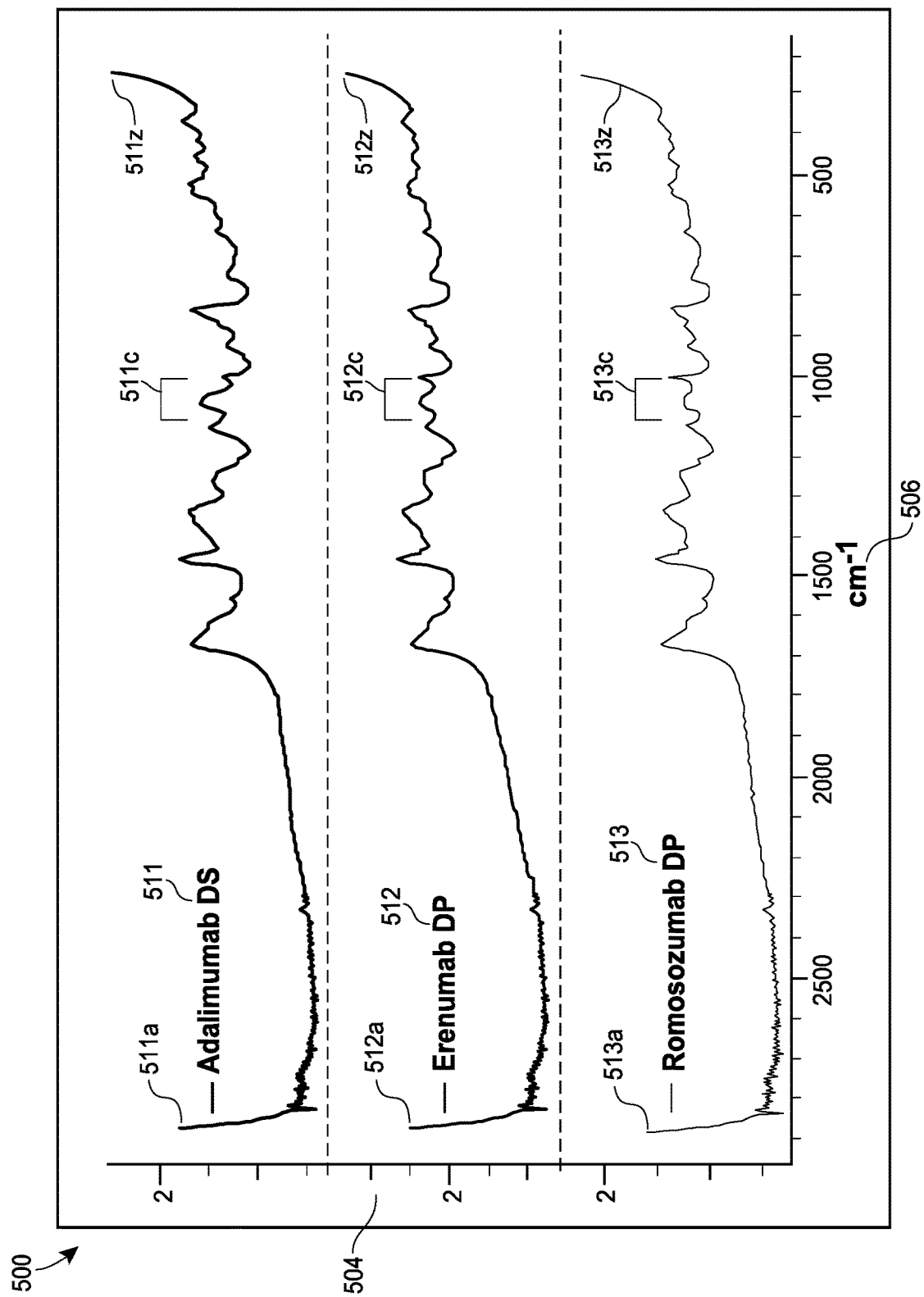
FIG. 5 illustrates an example visualization of Raman spectra of biological product types, in accordance with various embodiments disclosed herein.

FIG. 5 illustrates an example visualization 500 of Raman spectra of biological product types (e.g., biological product types 511, 512, and 513). Each of the biological product types (e.g., biological product types 511, 512, and 513) can be identified, classified, or otherwise distinguished with a biological classification model (e.g., a biological classification model of biological classification model configuration 103) based on a classification component, in accordance with various embodiments disclosed herein. In the embodiment of FIG. 5, each of biological product types 511, 512, and 513 are different biological product types that include adalimumab DS (biological product type 511), erenumab DP (biological product type 512), and romosozumab DP (biological product type 513), respectively. Visualization 500 of FIG. 5 includes Raman intensity axis 504 and Raman shift axis 506, which are the same or similar as described herein for FIGS. 3A and 3B. However, each biological product types 511, 512, and 513 depicts its own, separate Raman shift axis, where each Raman shift axis indicates Raman intensity values from 0 to approximately 3. In addition, Raman shift axis 506 depicts a frequency/wavelength range of approximately 0 to 3000 cm$^{-1}$.

As shown in FIG. 5, each of biological product types 511, 512, and 513 has a similar pattern or "signature" across Raman shift axis 506, i.e., across a same or similar Raman spectra range (e.g., a range of 0 to 3000 cm$^{-1}$ as shown in FIG. 5). This similar pattern/signature makes it difficult for a typical analyzer to accurately identify, classify, or measure the biological product types adalimumab DS (biological product type 511), erenumab DP (biological product type 512), and romosozumab DP (biological product type 513). A typical analyzer (not implementing or executing biological classification model configuration 103 as described herein) generally produces significant numbers of Type I (e.g., false positives) and Type II errors (e.g., false negatives) when attempting to identify, measure, or classify such biological product types.

However, a configurable handheld biological analyzer (e.g., configurable handheld biological analyzer 102), loaded and executing a biological classification model configuration (e.g., biological classification model configuration 103) as described herein, may be used to accurately identify, classify, measure, or otherwise distinguish the biological product types adalimumab DS (biological product type 511), erenumab DP (biological product type 512), and romosozumab DP (biological product type 513). This is illustrated in FIG. 5, where, for example, each of biological product types adalimumab DS (biological product type 511), erenumab DP (biological product type 512), and romosozumab DP (biological product type 513) are identified, classified, and/or measured as distinct from one another by distinct localized features (e.g., localized features 511c, 512c, and 513c) of the Raman spectra. In the embodiment of FIG. 5, for example, each of localized features 511c, 512c, and 513c of each of biological product types adalimumab DS (biological product type 511), erenumab DP (biological product type 512), and romosozumab DP (biological product type 513) are distinct across Raman shift axis 506 across range 1000 cm$^{-1}$ to 1100 cm$^{-1}$. In particular, across the range of 1000 cm$^{-1}$ to 1100 cm$^{-1}$, each of localized features 511c, 512c, and 513c have different Raman intensity values (having different shapes, peaks, or otherwise distinct/different relative intensities), that are specific to each of biological product types adalimumab DS (biological product type 511), erenumab DP (biological product type 512), and romosozumab DP (biological product type 513), respectively. Because of this, the distinct localized features (e.g., localized features 511c, 512c, and 513c) provide a source of product specific information that can be used by configurable handheld biological analyzer 102 to identify, classify, or otherwise distinguish biological products as described herein.

Additionally, or alternatively, with respect to FIG. 5, identification or classification is further illustrated where, for example, each of biological product types adalimumab DS (biological product type 511), erenumab DP (biological product type 512), and romosozumab DP (biological product type 513) are identified, classified, and/or measured as distinct from one another by their respective Raman shift axes, i.e., across Raman shift axis 506 (even those these biological products have similar and/or same Raman spectras). For example, adalimumab DS (biological product type 511) has a first Raman intensity value 511a of approximately 1.9 (at a Raman shift value of approximately 2900) and a second Raman intensity value 511z of approximately 2.25 (at a Raman shift value of approximately 140). By contrast, erenumab DP (biological product type 512) has a first Raman intensity value 512a of approximately 2.1 (at a Raman shift value of approximately 2900) and a second Raman intensity value 512z of approximately 2.5 (at a Raman shift value of approximately 140). By further contrast, romosozumab DP (biological product type 513) has a first Raman intensity value 513a of approximately 1.5 (at a Raman shift value of approximately 2900) and a second Raman intensity value 513z of approximately 2.05 (at a Raman shift value of approximately 140).

Accordingly, as illustrated by visualization 500 of FIG. 5, a configurable handheld biological analyzer (e.g., configurable handheld biological analyzer 102), loaded with, and executing, a biological classification model configuration (e.g., biological classification model configuration 103) as described herein, is sensitive to relative differences in Raman intensity values (e.g., of Raman intensity axis 504) and the overall shapes of the Raman features (i.e., Raman intensity profile over a range of Raman shift values, Raman shift axis 506) across different analyzers. This is because, at least in part a configurable handheld biological analyzer (e.g., configurable handheld biological analyzer 102), loaded with, and executing, a biological classification model configuration (e.g., biological classification model configuration 103) as described herein, has preprocessed scanned data (Raman-based spectra datasets) of each of the biological product types adalimumab DS (biological product type 511), erenumab DP (biological product type 512), and romosozumab DP (biological product type 513) with the spectral preprocessing algorithm as described herein. Moreover, the biological classification model, as used by the configurable handheld biological analyzer (e.g., configurable handheld biological analyzer 102), is further configured to identify the biological product type of the first biological product sample based on the classification component (i.e., to implement a model having a classification component), which also reduces variance thereby improving the ability of the configurable handheld biological analyzer 102 to identify the biological product type of the first biological product sample.

In various embodiments, a configurable handheld biological analyzer (e.g., configurable handheld biological analyzer 102) identifies, classifies, and/or measures biological product types of biological products (e.g., biological products 140), such as adalimumab DS (biological product type 511), erenumab DP (biological product type 512), and romosozumab DP (biological product type 513), based on classification component(s) as loaded from biological classification model configuration (e.g., biological classification model configuration 103). For example, a biological classification model, e.g., as loaded via a biological classification model configuration 103 into configurable handheld biological analyzer 102, may comprise a classification component selected to reduce at least one of (1) a Q-residual error of the biological classification model, or (2) a summary-of-fit value of the biological classification model, each of which are further described with respect to FIGS. 4A and 4B herein.

As term is used herein a "classification component" may comprise a principal component determined for a principal component analysis (PCA). In other embodiments, more generally, a classification component can be a coefficient or variable of multivariate model (such as a regression model or machine learning model). Based on the classification component, the biological classification model is configured to identify the biological product type of a given biological product sample (e.g., selected from biological products 140).

In some embodiments, a biological classification model may be implemented as a PCA model. A PCA implementation represents use of multivariate analysis, e.g., as implemented by configurable handheld biological analyzer 102 configured with biological classification model configuration 103, for distinguishing biological products (e.g., biological products 140), such as therapeutic products/drugs having similar formulations (e.g., as describe herein for FIG. 5). For example, biological or pharmaceutical products are typically associated with high-dimensional data. High-dimensional data can include multiple features, such as expression of many genes, measured on a given sample (e.g., a sample of scanning biological products 140). PCA provides a technique, as used by configurable handheld biological analyzer 102, to simplify complexity in high-dimensional data (e.g., Raman spectra dataset(s)) while retaining trends and patterns that are useful for predictive and/or identification purposes (e.g., identifying biological products as describe herein). For example, application of PCA includes transforming (e.g., by first processor 110) a dataset (e.g., a Raman-based spectra dataset) into fewer dimensions. A transformed dataset with fewer dimensions provides a summary or simplification of the original dataset. The transformed dataset, in turn, reduces computational expense when manipulated by a configurable handheld biological analyzer (e.g., configurable handheld biological analyzer 102) described herein. Further, error rate(s), as described herein, may also be reduced by implementing PCA thereby eliminating the need to apply test correction(s) to data of a higher-dimension when testing each feature for association with a particular outcome.

In addition, PCA, as implemented by configurable handheld biological analyzer 102, reduces data complexity by geometrically projecting them onto lower dimensions called principal components (PCs), and by targeting the best summary of the data, and therefore PCs, by using a limited number of PCs. A first PC is chosen to minimize the total distance between the data and their projection onto the PC. Any second (subsequent) PCs are selected similarly, with the additional requirement that they be uncorrelated with all previous PCs.

PCA is an unsupervised learning method and is similar to clustering—it finds trends or patterns without reference to prior knowledge about whether the samples come from different sources, such as different configurable handheld biological analyzers (e.g., configurable handheld biological analyzers 102, 112, 114, and/or 116). For example, in some embodiments, a classification component, of a biological classification model, may be a first principal component of a PCA model. In such embodiments, the first principal component may be determined, by first processor 110, based on a singular value decomposition (SVD) analysis. Use of a first principal component, by configurable handheld biological analyzer 102, limits or reduces the amount of analyzer variability accounted for by its biological classification model. In some embodiments, the first principal component (PC) may be the only principal component. In other embodiments, a biological classification model may comprise a second classification component, where a biological classification model is configured to identify biological product type(s) of a given biological product sample (e.g., biological products 140) based on multiple classification components (e.g., the first classification component and the second classification component).

In the embodiment computer program listing of FIGS. 6A to 6C, at Code Section 7, a biological classification model configuration (e.g., biological classification model configuration 103) defines a set of PCA predictions specified for its biological classification model. Code Section 7 also provides a script defining calculations for summary-of-fit statistic values (e.g., Hotelling $T^2$ values) and Q-residuals/values. The script of Code Section 7 may be executed by first processor 110 to identify or classify biological products (e.g., biological products 140) based on Q-residuals/values and Hotelling $T^2$ values, as described herein, for example, with respect to FIGS. 4A and 4B.

Figure 4A:
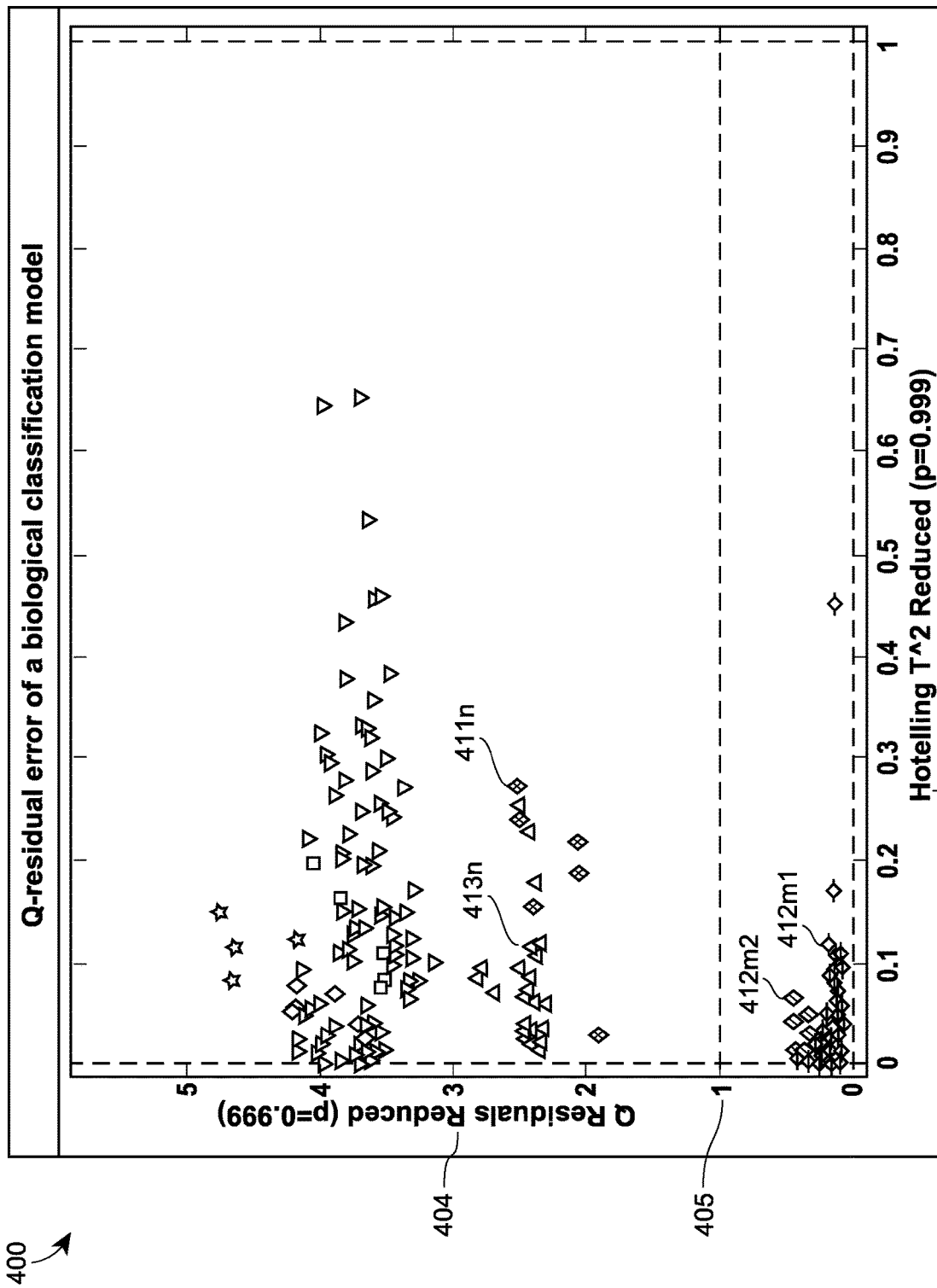
FIG. 4A illustrates an example visualization of Q-residual error of a biological classification model.

FIG. 4A illustrates an example visualization 400 of Q-residual error of a biological classification model. FIG. 4A includes a Q-residual error axis 404 and a Hotelling $T^2$ axis 406. Generally, Q-residual error and Hotelling $T^2$ values are summary statistics that can be used to explain how well a model (e.g., biological classification model of biological classification model configurations 103) is describing a given biological product sample (e.g., taken from scanning biological products 140). FIG. 4A plots Q-residual error and Hotelling $T^2$ values of a number of handheld biological analyzers. Generally, a handheld biological analyzer having a Q-residual error of zero (0) and Hotelling $T^2$ value of zero (0) represents a scan of a product with no error.

The handheld biological analyzers include handheld biological analyzers of biological analyzer groups 411$n$, 412$m$1, 412$m$2, and 413$n$. Analyzer group 411$n$ represents analyzers that scanned a first biological product type, adalimumab DS. Analyzer groups 412$m$1 and 412$m$2 each represent analyzers that scanned a second biological product type, erenumab DP. Analyzer group 413$n$ represents analyzers that scanned a third biological product type, romosozumab DP. Analyzer groups 412$m$1 and 412$m$2 comprise configurable handheld biological analyzers (e.g., any of configurable handheld biological analyzers 102, 112, 114, and/or 116) configured, and enhanced, with biological classification model configurations (e.g., biological classification model configuration 103) and respective biological classification models as described herein. Analyzer groups 411$n$ and 413$n$ comprise typical biological analyzers, not configured with biological classification model configurations or biological classification models.

Analyzer groups 411$n$ and 413$n$ serve as a control group, that when compared with analyzer groups 412$m$1 and 412$m$2, illustrate the improvement, through reduced error (e.g., along Q-residual error axis 404), of the configurable handheld biological analyzers (e.g., any of configurable handheld biological analyzers 102, 112, 114, and/or 116) over typical analyzers, e.g., of analyzers of analyzer groups 411$n$ and 413$n$. In particular, Q-residuals (e.g., of Q-residual error axis 404) provide a lack-of-fit statistic calculated as the sum of squares of each product sample. Q-residuals represent a magnitude of variation remaining in each sample after projection through a given model (e.g., a biological classification model as described herein). More generally, as illustrated by the embodiment of FIG. 4A, Q-residual values (along Q-residual error axis 404) serve as a discriminating statistic. Q-residuals is a measure of "what is left," or what is not explained, by a given biological classification model. For example, in an embodiment where a biological classification model is implemented as a PCA model (e.g., where a spectrum is projected on a first principal component), the values of FIG. 4A would show what is left (the residuals) after the scanned data (e.g., of biological analyzer groups 411n, 412m1, 412m2, and/or 413n) is projected by the first principal component.

In various embodiments, a configurable handheld biological analyzer (e.g., configurable handheld biological analyzer 102) includes a biological classification model (e.g., of biological classification model configuration 103) configured to identify or classify a biological product type of a biological product sample (e.g., taken from biological products 140) based on the classification component when the Q-residual error satisfies a threshold value. In some embodiments, a biological classification model, e.g., as implemented or executed by first processor 110 of configurable handheld biological analyzer 102, outputs a pass-fail determination based on the threshold value. For example, in the embodiment of FIG. 4A, a threshold value of "1," across Q-residual error axis 404, is selected as a pass-fail determinant threshold 405. In such embodiments, a configurable handheld biological analyzer (e.g., configurable handheld biological analyzer 102) implementing biological classification model, would identify or classify (i.e., "pass") those biological products with scanned data (e.g., Raman spectra dataset(s)) falling within (i.e., below) the threshold value of 1 across the Q-residual error axis 404. Otherwise the biological analyzer (e.g., configurable handheld biological analyzer 102) implementing biological classification model would not identify or classify (i.e., "fail") those biological products.

In the embodiment of FIG. 4A, analyzer groups 412m1 and 412m2 comprise configurable handheld biological analyzers (e.g., any of configurable handheld biological analyzers 102, 112, 114, and/or 116) configured and enhanced with biological classification model configurations (e.g., biological classification model configuration 103) and respective biological classification models as described herein. The configurable handheld biological analyzers of analyzer groups 412m1 and 412m2 correctly identify or classify (i.e., "pass") the biological products (i.e., erenumab DP), where the related scanned data (e.g., Raman spectra dataset(s)), when preprocessed with the spectral preprocessing algorithm as described herein, fall within (i.e., below) the threshold value of 1, as shown by visualization 400.

Accordingly, a biological classification model, of a configurable handheld biological analyzer (e.g., configurable handheld biological analyzer 102) may comprise a classification component selected to reduce a Q-residual error of the biological classification model. In this way, the biological classification model is configured to identify the biological product type of a given biological product sample based on the classification component. Generally, Q-residuals are best used for biological products with single specification methods where lot-to-lot variability is the major source of variance among analyzers. Accordingly, as illustrated by FIG. 4A, Q-residuals may be used as a discriminating statistic to determine models (e.g., biological classification models as described herein) that are tolerant of analyzer-to-analyzer variability.

FIG. 4B illustrates an example visualization 450 of summary-of-fit values (e.g., Hotelling $T^2$ values) of a biological classification model. Generally, Hotelling $T^2$ values represent a measure of the variation in each sample within a model (e.g., a biological classification model). Hotelling $T^2$ values indicate how far each sample is from a "center" (value of 0) of the model. Said another way, a Hotelling $T^2$ value is an indicator of distance from the model center. Distance from the center can often occur due to analyzer-to-analyzer variability. Using Hotelling $T^2$ values is advantageous to identify biological products with multiple specifications. In these cases, different concentrations of the active ingredient, excipients, etc., give rise to more substantial variability in the Raman spectra than lot-to-lot variation (as describe above herein for Q-residuals with respect to FIG. 4A).

In the embodiment of FIG. 4B, a configurable handheld biological analyzer (e.g., configurable handheld biological analyzer 102) includes a biological classification model (e.g., of biological classification model configuration 103) configured to identify or classify a biological product type of a biological product sample (e.g., taken from biological products 140) based on the classification component when the summary-of-fit value (e.g., Hotelling $T^2$) satisfies a threshold value. FIG. 4B includes the same Q-residual error axis 404 and Hotelling $T^2$ axis 406 as described herein for FIG. 4A. Analyzer group 452m represents analyzers that scanned a first biological product type, denosumab DP (having 2 specifications). Analyzer group 454m represents analyzers that scanned a second biological product type, denosumab DS (having 1 specification). Analyzer group 462n represents analyzers that scanned a third biological product type, enbrel DP. In the embodiment of FIG. 4B, a threshold value of "1," across Hotelling $T^2$ axis 406, is selected as a pass-fail determinant threshold 407. In such embodiments, a configurable handheld biological analyzer (e.g., configurable handheld biological analyzer 102) implementing biological classification model, would identify or classify (i.e., "pass") those biological products with scanned data (e.g., Raman spectra dataset(s)) falling within (i.e., below) the threshold value of 1 of the Hotelling $T^2$ axis 406. Otherwise the biological analyzer (e.g., configurable handheld biological analyzer 102) implementing biological classification model would not identify or classify (i.e., "fail") those biological products.

In the embodiment of FIG. 4B, a biological classification model, of a configurable handheld biological analyzer (e.g., configurable handheld biological analyzer 102) may comprise a classification component selected to reduce a summary-of-fit value (e.g., Hotelling $T^2$ value) of the biological classification model. In this way, the biological classification mode is configured to identify the biological product type of a given biological product sample based on the classification component. For example, analyzer groups 452m and 454m comprise configurable handheld biological analyzers (e.g., any of configurable handheld biological analyzers 102, 112, 114, and/or 116) configured and enhanced with biological classification model configurations (e.g., biological classification model configuration 103) and respective biological classification models as described herein. The configurable handheld biological analyzers of analyzer groups 412m1 and 412m2 correctly identify or classify (i.e., "pass") the biological products (i.e., denosumab DP and DS), where the related scanned data (e.g., Raman spectra dataset(s)), when preprocessed with the spectral preprocessing algorithm as described herein, fall within (i.e., below) the threshold value of 1, as shown by visualization 450. By contrast, analyzer group 462n may represent an analyzer not configured with a biological classification model configuration as described herein.

As shown by each of FIGS. 4A and 4B, each of Q-residual errors (e.g., of Q-residual error axis 404) and/or Hotelling $T^2$ values may be used alone or together to identify or classify biological products. That is, a configurable handheld biological analyzer 102 may be configured to select or implement a classification component to reduce one or both of (1) the Q-residual error of the biological classification model and/or (2) the summary-of-fit value of the biological classification model.

As described herein, with respect to FIGS. 2, 3A, 3B, 3C, 4A, 4B, and 5, a biological classification model may be configured, to identify, classify, measure, or otherwise distinguish, based on a classification component, a given biological product sample having a given biological product type (e.g., adalimumab DS (biological product type 511)) from a different or second biological product sample having a different or second biological product type (e.g., erenumab DP (biological product type 512)). For example, as described with respect to FIGS. 4A, 4B, and 5, the configurable handheld biological analyzer 102 may distinguish the first biological product type (e.g., adalimumab DS (biological product type 511)) and the different biological product type (e.g., erenumab DP (biological product type 512)). For example, as described herein, configurable handheld biological analyzer 102, once configured with biological classification model configuration 103, can execute a spectral preprocessing algorithm (e.g., as described herein FIGS. 3A to 3C) on a Raman-based spectra dataset as received by first scanner 106. Once the Raman-based spectra dataset is preprocessed by the spectral preprocessing algorithm, the configurable handheld biological analyzer 102 may identify or classify a biological product based on Q-residuals and/or Hotelling T2 values (e.g., as described herein for FIGS. 4A and 4B).

A biological product type may be identified, by configurable handheld biological analyzer 102 (e.g., by first processor 110) executing a biological classification model and/or a spectral preprocessing algorithm, during development or manufacture of a biological product, such as biological products 140 having a given biological product type, for example, any of adalimumab DS (biological product type 511), erenumab DP (biological product type 512), and/or romosozumab DP (biological product type 513) as described herein. It should be understood, however, that these biological product types are merely examples, and that other biological product types or biological products may be identified, classified, measured, or otherwise distinguished in a same or similar manner as described for the various embodiments herein.

Aspects of the Present Disclosure

1. A configurable handheld biological analyzer for identification of biological products based on Raman spectroscopy, the configurable handheld biological analyzer comprising: a first housing adapted for handheld manipulation; a first scanner carried by the first housing; a first processor communicatively coupled to the first scanner; and a first computer memory communicatively coupled to the first processor, wherein the first computer memory is configured to load a biological classification model configuration, the biological classification model configuration comprising a biological classification model, wherein the biological classification model is configured to execute on the first processor, the first processor configured to (1) receive a first Raman-based spectra dataset defining a first biological product sample as scanned by the first scanner, and (2) identify, with the biological classification model, a biological product type based on the first Raman-based spectra dataset, wherein the biological classification model configuration further comprises a spectral preprocessing algorithm, the first processor configured to execute the spectral preprocessing algorithm to reduce a spectral variance of the first Raman-based spectra dataset when the first Raman-based spectra dataset is received by the first processor, and wherein the biological classification model comprises a classification component selected to reduce at least one of (1) a Q-residual error of the biological classification model, or (2) a summary-of-fit value of the biological classification model, the biological classification model configured to identify the biological product type of the first biological product sample based on the classification component.

2. The configurable handheld biological analyzer of aspect 1, wherein the biological classification model configuration is electronically transferrable to a second configurable handheld biological analyzer, the second configurable handheld biological analyzer comprising: a second housing adapted for handheld manipulation; a second scanner coupled to the second housing; a second processor communicatively coupled to the second scanner; and a second computer memory communicatively coupled to the second processor, wherein the second computer memory is configured to load the biological classification model configuration, the biological classification model configuration comprising the biological classification model, wherein the biological classification model is configured to execute on the second processor, the second processor configured to (1) receive a second Raman-based spectra dataset defining a second biological product sample as scanned by the second scanner, and (2) identify, with the biological classification model, the biological product type based on the second Raman-based spectra dataset, wherein the second biological product sample is a new sample of the biological product type.

3. The configurable handheld biological analyzer of any of the aforementioned aspects, wherein the spectral variance is an analyzer-to-analyzer spectral variance between the first Raman-based spectra dataset and one or more other Raman-based spectra datasets of one or more corresponding other handheld biological analyzers, each of the one or more other Raman-based spectra datasets representative of the biological product type, and wherein the spectral preprocessing algorithm is configured to reduce the analyzer-to-analyzer spectral variance between the first Raman-based spectra dataset and the one or more other Raman-based spectra datasets.

4. The configurable handheld biological analyzer of aspect 3, wherein the spectral preprocessing algorithm comprises: applying a derivative transformation to the first Raman-based spectra dataset to generate a modified Raman-based spectra dataset, aligning the modified Raman-based spectra dataset across a Raman shift axis, and normalizing the modified Raman-based spectra dataset across a Raman intensity axis.

5. The configurable handheld biological analyzer of aspect 4, wherein the derivative transformation includes determining Raman weighted averages of consecutive groups of 11 to 15 Raman shift values across the Raman shift axis, and determining corresponding derivatives of those Raman weighted averages across the Raman shift axis.

6. The configurable handheld biological analyzer of any of the aforementioned aspects, wherein the classification component is selected to reduce both of (1) the Q-residual error of the biological classification model and (2) the summary-of-fit value of the biological classification model.

7. The configurable handheld biological analyzer of any of the aforementioned aspects, wherein the biological classification model further comprises a second classification component, the biological classification model configured to identify the biological product type of the first biological product sample based on the classification component and the second classification component.

8. The configurable handheld biological analyzer of any of the aforementioned aspects, wherein the biological classification model is implemented as a principal component analysis (PCA) model.

9. The configurable handheld biological analyzer of aspect 8, wherein the classification component is a first principal component of the PCA model.

10. The configurable handheld biological analyzer of any of the aforementioned aspects, wherein the computer memory is configured to load a new biological classification model, the new biological classification model comprising an updated classification component.

11. The configurable handheld biological analyzer of any of the aforementioned aspects, wherein the biological classification model configuration is implemented in an extensible markup language (XML) format.

12. The configurable handheld biological analyzer of any of the aforementioned aspects, wherein the biological product type is of a therapeutic product.

13. The configurable handheld biological analyzer of any of the aforementioned aspects, wherein the biological product type is identified by the biological classification model during manufacture of a biological product having the biological product type.

14. The configurable handheld biological analyzer of any of the aforementioned aspects, wherein biological classification model is configured to distinguish, based on the classification component, the first biological product sample having the biological product type from a different biological product sample having a different biological product type.

15. The configurable handheld biological analyzer of aspect 14, wherein the biological product type and the different biological product type each have distinct localized features within a same or similar Raman spectra range.

16. The configurable handheld biological analyzer of any of the aforementioned aspects, wherein the biological classification model is configured to identify the biological product type of the first biological product sample based on the classification component when the Q-residual error or the summary-of-fit value satisfies a threshold value.

17. The configurable handheld biological analyzer of aspect 16, wherein the biological classification model outputs a pass-fail determination based on the threshold value.

18. The configurable handheld biological analyzer of any of the aforementioned aspects, wherein the biological classification model is generated by a remote processor being remote to the configurable handheld biological analyzer.

19. A biological analytics method for identification of biological products based on Raman spectroscopy, the biological analytics method comprising: loading, into a first computer memory of a first configurable handheld biological analyzer having a first processor and a first scanner, a biological classification model configuration, the biological classification model configuration comprising a biological classification model; receiving, by the biological classification model, a first Raman-based spectra dataset defining a first biological product sample as scanned by the first scanner; executing a spectral preprocessing algorithm of the biological classification model to reduce a spectral variance of the first Raman-based spectra dataset; and identifying, with the biological classification model, a biological product type based on the first Raman-based spectra dataset, wherein the biological classification model comprises a classification component selected to reduce at least one of (1) a Q-residual error of the biological classification model, or (2) a summary-of-fit value of the biological classification model, the biological classification model configured to identify the biological product type of the first biological product sample based on the classification component.

20. The biological analytics method of aspect 19, wherein the biological classification model configuration is electronically transferrable to a second configurable handheld biological analyzer, the biological analytics method further comprising: loading, into a second computer memory of a second configurable handheld biological analyzer having a second processor and a second scanner, the biological classification model configuration, the biological classification model configuration comprising the biological classification model; receiving, by the biological classification model, a second Raman-based spectra dataset defining a second biological product sample as scanned by the second scanner; executing the spectral preprocessing algorithm of the biological classification model to reduce a second spectral variance of the second Raman-based spectra dataset; and identifying, with the biological classification model, the biological product type based on the second Raman-based spectra dataset, wherein the second biological product sample is a new sample of the biological product type.

21. The biological analytics method of any one or more of aspects 19 to 20, wherein the spectral variance is an analyzer-to-analyzer spectral variance between the first Raman-based spectra dataset and one or more other Raman-based spectra datasets of one or more corresponding other handheld biological analyzers, each of the one or more other Raman-based spectra datasets representative of the biological product type, and wherein the spectral preprocessing algorithm is configured to reduce the analyzer-to-analyzer spectral variance between the first Raman-based spectra dataset and the one or more other Raman-based spectra datasets.

22. The biological analytics method of aspect 21, wherein the spectral preprocessing algorithm comprises: applying a derivative transformation to the first Raman-based spectra dataset to generate a modified Raman-based spectra dataset, aligning the modified Raman-based spectra dataset across a Raman shift axis, and normalizing the modified Raman-based spectra dataset across a Raman intensity axis.

23. The biological analytics method of aspect 22, wherein the derivative transformation includes determining Raman weighted averages of consecutive groups of 11 to 15 Raman shift values across the Raman shift axis, and determining corresponding derivatives of those Raman weighted averages across the Raman shift axis.

24. The biological analytics method of any one or more of aspects 19 to 23, wherein the classification component is selected to reduce both of (1) the Q-residual error of the biological classification model and (2) the summary-of-fit value of the biological classification model.

25. The biological analytics method of any one or more of aspects 19 to 24, wherein the biological classification model further comprises a second classification component, the biological classification model configured to identify the biological product type of the first biological product sample based on the classification component and the second classification component.

26. The biological analytics method of any one or more of aspects 19 to 25, wherein the biological classification model is implemented as a principal component analysis (PCA) model.

27. The biological analytics method of aspect 26, wherein the classification component is a first principal component of the PCA model.

28. The biological analytics method of any one or more of aspects 19 to 27, wherein the first and/or second computer memory is configured to load a new biological classification model, the new biological classification model comprising an updated classification component.

29. The biological analytics method of any one or more of aspects 19 to 28, wherein the biological classification model configuration is implemented in an extensible markup language (XML) format.

30. The biological analytics method of any one or more of aspects 19 to 29, wherein the biological product type is of a therapeutic product.

31. The biological analytics method of any one or more of aspects 19 to 30, wherein the biological product type is identified by the biological classification model during manufacture of a biological product having the biological product type.

32. The biological analytics method of any one or more of aspects 19 to 31, wherein biological classification model is configured to distinguish, based on the classification component, the first biological product sample having the biological product type from a different biological product sample having a different biological product type.

33. The biological analytics method of aspect 32, wherein the biological product type and the different biological product type each have a same or similar Raman spectra range.

34. The biological analytics method of any one or more of aspects 19 to 33, wherein the biological classification model is configured to identify the biological product type of the first biological product sample based on the classification component when the Q-residual error or the summary-of-fit value satisfies a threshold value.

35. The biological analytics method of aspect 34, wherein the biological classification model outputs a pass-fail determination based on the threshold value.

36. The biological analytics method of any one or more of aspects 19 to 35, wherein the biological classification model is generated by a remote processor being remote to the configurable handheld biological analyzer.

37. A tangible, non-transitory computer-readable medium storing instructions for identification of biological products based on Raman spectroscopy, that when executed by one or more processors of a configurable handheld biological analyzer cause the one or more processors of the configurable handheld biological analyzer to: load, into a computer memory of the configurable handheld biological analyzer having a scanner, a biological classification model configuration, the biological classification model configuration comprising a biological classification model; receive, by the biological classification model, a Raman-based spectra dataset defining a biological product sample as scanned by the scanner; execute a spectral preprocessing algorithm of the biological classification model to reduce a spectral variance of the Raman-based spectra dataset; and identify, with the biological classification model, a biological product type based on the Raman-based spectra dataset, wherein the biological classification model comprises a classification component selected to reduce at least one of (1) a Q-residual error of the biological classification model, or (2) a summary-of-fit value of the biological classification model, the biological classification model configured to identify the biological product type of the biological product sample based on the classification component.

The foregoing aspects of the disclosure are exemplary only and not intended to limit the scope of the disclosure.

Additional Examples

The below additional examples provide additional support in accordance with various embodiments described herein. In particular, the below additional examples demonstrate Raman spectroscopy for rapid identity (ID) verification of biotherapeutic protein products in solution. The examples demonstrate a unique combination of Raman features associated with both a therapeutic agent and excipients as the basis for product differentiation. Product ID methods (e.g., biological analytics methods), as described herein, include acquiring Raman spectra of the target product(s) on multiple Raman analyzers (e.g., configurable handheld biological analyzers, as described herein). The spectra may then subjected to dimension reduction using principal component analysis (PCA) to define product-specific models (e.g., biological classification models) which serve as the basis for an product ID determination for configurable handheld biological analyzers and biological analytics method for identification of biological products based on Raman spectroscopy as described herein. The product-specific models (e.g., biological classification models) can be transferred to separate instruments (e.g., configurable handheld biological analyzers) that are validated for product testing. These may be used for various purposes including quality control, incoming quality assurance, and manufacturing. Such analyzers and methods may be used across different Raman apparatuses (e.g., configurable handheld biological analyzers) from different manufacturers. In this way, the additional examples further demonstrate that the Raman ID analyzers and methods describe herein (e.g., the configurable handheld biological analyzers and related methods) provide various uses and tests for solution-based protein products in the biopharmaceutical industry.

Additional Examples—Materials

Drug substance and drug product, corresponding to more than 28 individual product specifications, were analyzed in the development and testing of the configurable handheld biological analyzers and related methods described herein. Table 1 itemizes Active Pharmaceutical Ingredients (API) concentrations and molecule classes for 14 product specifications, representing a set of late-stage and commercial product specifications. Product solutions were transferred to 4 mL glass vials, which served as the sample cell for Raman spectrum acquisition. Table 1 provides general properties of evaluated products, either as targets for the ID methods (e.g., biological analytics methods) or specificity challenges as described herein. For simplicity for Table 1, each product is labeled with a character code. Products with the same character letter but different numbers (e.g., A1 and A2) denote products with the same active ingredient that may differ in the protein concentration and/or formulation. The listed materials may be used in the making of drug products. It will be appreciated that some drug products may be identified by brand names, for example as noted herein.

TABLE 1

(API Concentrations and Molecule Classes)

| Product Abbreviation | Concentration (mg/mL) | Molecule Class |
| --- | --- | --- |
| A1 (panitumumab) | 20 | IgG2 |
| A2 (panitumumab) | 40 | IgG2 |
| B1 (denosumab) | 60 | IgG2 |
| B2 (denosumab) | 70 | IgG2 |
| B3 (denosumab) | 70 | IgG2 |
| D1 (erenumab) | 70 | IgG2 |
| D2 (erenumab) | 140 | IgG2 |
| E1 (romosozumab) | 70 | IgG2 |
| E2 (romosozumab) | 90 | IgG2 |
| E3 (romosozumab) | 120 | IgG2 |
| H1 (adalimumab) | 50 | IgG1 |
| O1 (etanercept) | 50 | Fusion protein |
| Q1 (pegfilgrastim) | 10 | Cytokine |
| Q2 (pegfilgrastim) | 20 | Cytokine |

Additional Examples—Raman Instrumentation (e.g., Configurable Handheld Biological Analyzers) and Measurements With respect to the additional examples, Raman spectra were measured using configurable handheld biological analyzers, as described herein. For example, in certain embodiments, configurable handheld biological analyzers may be a Raman-based handheld analyzer, such as a TruScan™ RM Handheld Raman Analyzer as provided by Thermo Fisher Scientific Inc. In such embodiments, the configurable handheld biological analyzer may implement TruTools™ chemometrics software package. Although, it is to be understood, that other brands or types of Raman analyzers using additional and/or different software packages may be used in accordance with the disclosure herein. In some embodiments, the configurable handheld biological analyzers may be configured with a 785 nm grating-stabilized laser source (250 mW maximum output) coupled with focusing optics (e.g., 0.33 NA, 18 mm working distance, >0.2 mm spot) for sample interrogation. For the additional examples, product solutions, contained in glass vials, were secured in front of the focusing optics using a vial adapter for the configurable handheld biological analyzers. All spectra were collected using the following, identical spectral acquisition settings (although other settings may be used), e.g., laser power=250 mW, integration time=1000 ms, number of spectral co-additions=70. For the additional examples, product spectra were collected over a period of time using three different configurable handheld biological analyzers (hereafter referred to as configurable handheld biological analyzers 1-3) and/or instruments dedicated to the configuration and/or development of biological analytics method(s) for identification of biological products based on Raman spectroscopy as described herein. It is to be understood that additional or fewer analyzers using the same or different settings may be used for setting, configuring, or otherwise initializing configurable handheld biological analyzers, and the related biological analytics method(s), as described herein.

Additional Examples—Development of Multivariate Raman ID Biological Analytics Methods Raman spectral models (e.g., biological classification models) based on, for example, principal component analysis (PCA) may be generated, developed, or loaded as describe herein. For example, in some embodiments, SOLO software equipped with a Model Exporter add-on (Solo+ Model_Exporter version 8.2.1; Eigenvector Research, Inc.) may be used to generate, develop, or load a Raman spectral models (e.g., biological classification models). It is to be understood, however, that other software may be used to generate, develop, or load a Raman spectral models (e.g., biological classification models). Spectra used to build models may generally be collected as replicate scans on two or more distinct lots of material using configurable handheld biological analyzers (e.g., three configurable handheld biological analyzers). The spectra is generally acquired over multiple days for the purpose of including instrument drift. In some embodiments, prior to incorporation into a model (e.g., biological classification model), the spectral range may be reduced to exclude detector noise at >1800 cm-1and background variability arising from the Rayleigh line-rejection optics at <400 cm-1. The spectra may be further preprocessed and mean-centered, as described herein, for each model. The models additionally may be refined by cross-validation, using a random subset procedure, by reference to the Raman spectra of the target and challenge products, as shown in Table 1.

The biological classification model configuration (e.g., a PCA model configuration), along with the Raman spectral acquisition parameters, may be configured or loaded into configurable handheld biological analyzers and/or use biological analytics method(s) for identification of biological products based on Raman spectroscopy as described herein. The acceptance (e.g., pass-fail) criteria for each method may also be specified. As described herein, the pass-fail criteria may be based on threshold values for reduced Hotelling's $T^2 (T_r^2)$ and Q-residuals $(Q_r)$, which are two summary statistics that generally describe how well a Raman spectrum is described by a biological classification model (e.g., PCA model). Equations (1)-(4) below provide example user-selectable decision logic options for a positive identification or determination (e.g., pass-fail criteria) by the biological classification model (e.g., PCA model):

$$Q_r \leq 1.000000 \tag{1}$$

$$T_r^2 \leq 1.000000 \tag{2}$$

$$Q_r + T_r^2 \leq 1.000000 \tag{3}$$

$$\sqrt{[Q_r]^2 + [T_r^2]^2} \leq 21.000000 \tag{4}$$

In the above example equations the Hotelling's $T^2$ and Q-residuals values are normalized (i.e., reduced, $T_r^2$ and $Q_r$, respectively) by dividing the original values by the corresponding confidence interval, thereby setting the value of the upper bound to a value of 1.

Additional Examples—Configurable Handheld Biological Analyzer and Methods Transfer Testing With respect to the additional examples, a demonstration of the performance of the configurable handheld biological analyzers and related methods described herein for five product-specific models (e.g., biological classification models), as described herein for FIGS. 8A-8E, was carried out using a small fleet of analyzers (e.g., fifteen configurable handheld biological analyzers) naïve to the development of the configurable handheld biological analyzers and related methods described herein, i.e., not previously configured or loaded with a biological classification model configuration as described herein. The product ID methods (e.g., biological analytics methods for identification of biological products based on Raman spectroscopy) were prepared on configurable handheld biological analyzers 1-3 and implemented four tests for single product specifications (e.g., Q1, Q2, A1, and A2) and one test suited for identification of three similar specifications of the same protein product (e.g., B1, B2, and B3). Each test included using target product spectra acquired on fifteen additional instruments (analyzers 4-18), each of varying age and performance. Model specificity was gauged by also evaluating the closest specificity challenge product and formulation buffer (i.e., no protein). Raman spectra of the samples were acquired using identical collection parameters (i.e., laser power, acquisition time, number of co-additions) to those used to build the models. The Raman spectra was acquired as replicates across different days, resulting in approximately 250 spectra per product sample. The spectra acquired during testing was evaluated against each of five PCA models (e.g., in Eigenvector Solo+Model_Exporter software) to assess the likelihood of false-positive (i.e., misidentification of a challenge product as the target) and false-negative (i.e., incorrect rejection of the target product by the model) results.

Figure 7:
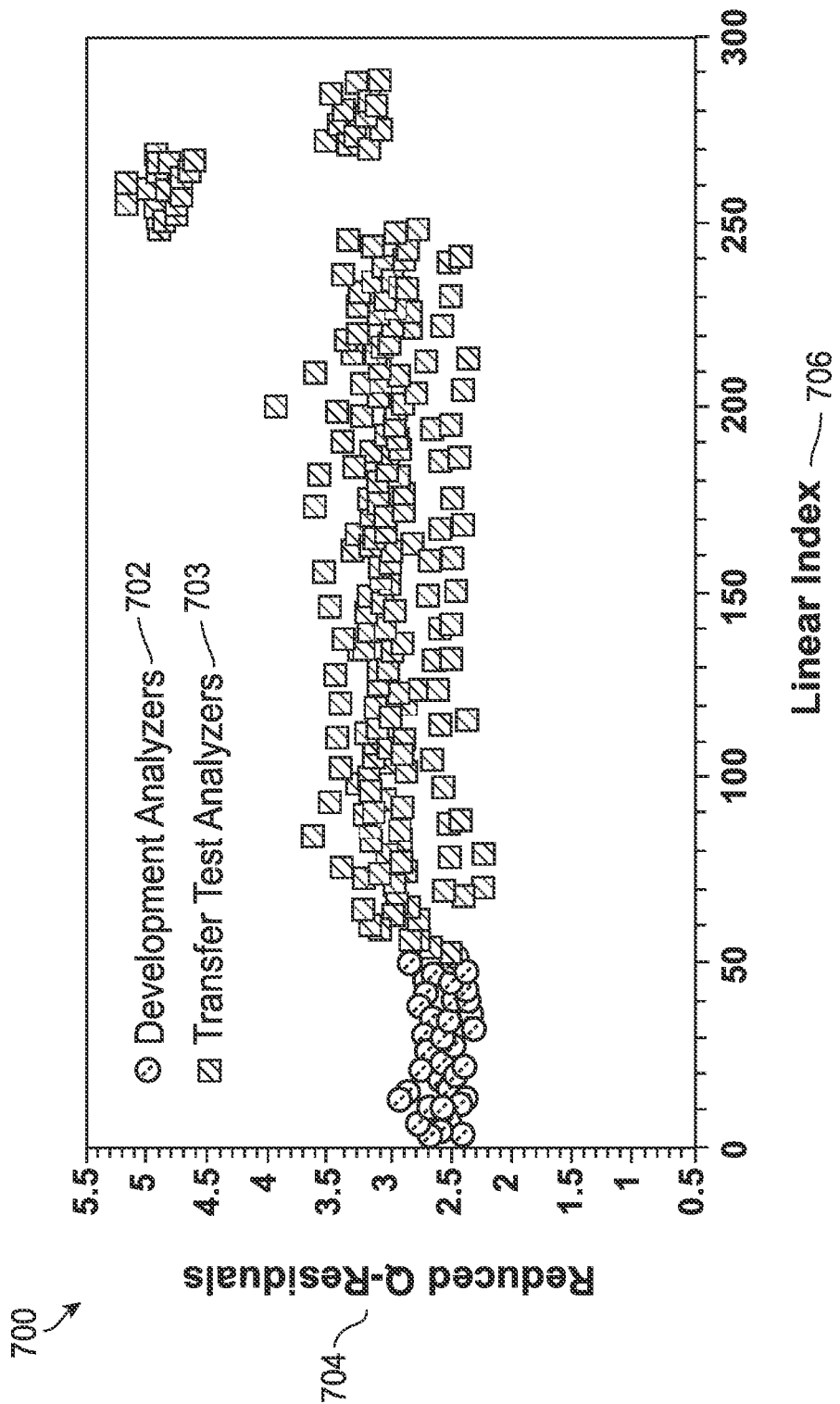
FIG. 7 illustrates an example visualization of reduced Q-residual errors, in accordance with various embodiments described herein.

During testing of the additional examples, there was not a single instance of a false-positive result for any of the five models and related tests, e.g., as described for FIGS. 8A-8E. Generally, the $Q_r$ or $T_r^2$ values for challenge products were greater for analyzers 4-18 versus those instruments used to develop the models. As an extension of this observation, the ability of a biological classification model (e.g., a PCA model) to consistently reject a given challenge product can be inferred with a high degree of confidence solely based on Raman spectra acquired during method development. FIG. 7 illustrates an example visualization 700 of reduced Q-residual errors 704, in accordance with various embodiments described herein. In particular, FIG. 7 provides an example plot of reduced Q-residual error values 700 for product A1 of Table 1, which is treated as a challenge product sample, evaluated against a biological classification model (e.g., a PCA model) for product A2 of Table 1. Linear index 706 is provided to index Raman spectra in the dataset and is not necessarily related to the sample.

The individual points in FIG. 7 are differentiated based on whether the corresponding Raman spectrum was acquired on an analyzer used to develop the model (702) or used strictly for testing (703). The $Q_r$ values for analyzer 8 (i.e., at linear index values of approximately 250-270) were abnormally high due to a known instrument performance issue, which is discussed below herein. Nonetheless, even by excluding the measurements made on analyzer 8, the $Q_r$ values for analyzers 4-18 do were not normally distributed based on rejection of the Shapiro-Wilk null-hypothesis (p=0.0013). For this data set, the median a value of 3.02 for analyzers 4-18 was significantly greater than the median $Q_r$ for development instruments of 2.53 (Mann-Whitney U test p-value<0.0001). There were no false-positives observed. However there were 33 false-negative predictions that should have been positive identifications across 1540 total measurements, equaling approximately 2% false-negatives only—a small fraction of the total number of analyses.

Figure 8A:
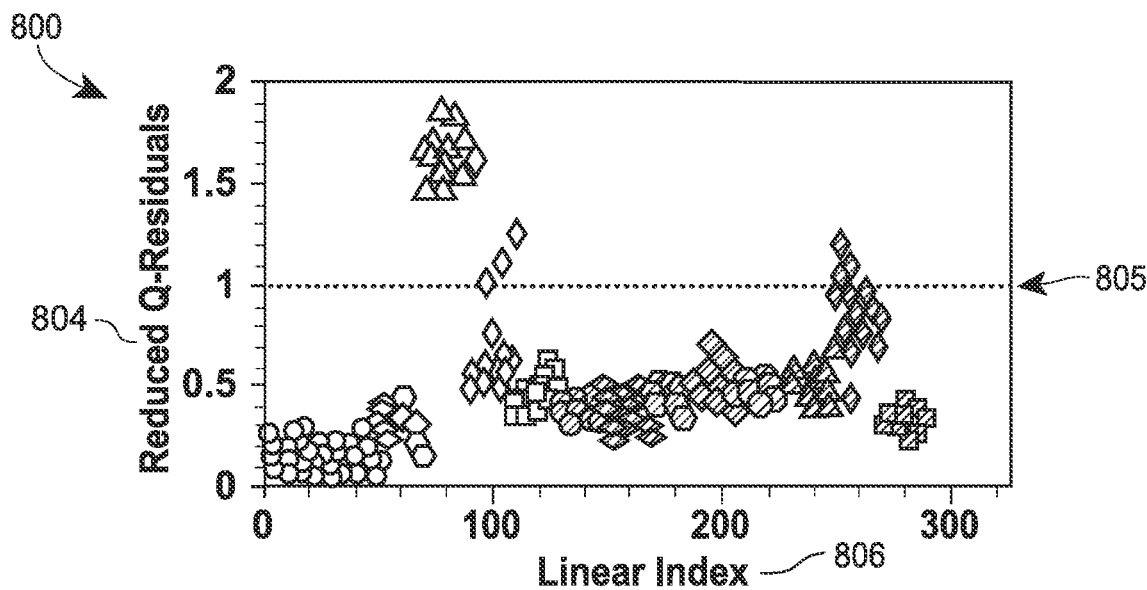
Figure 8B:
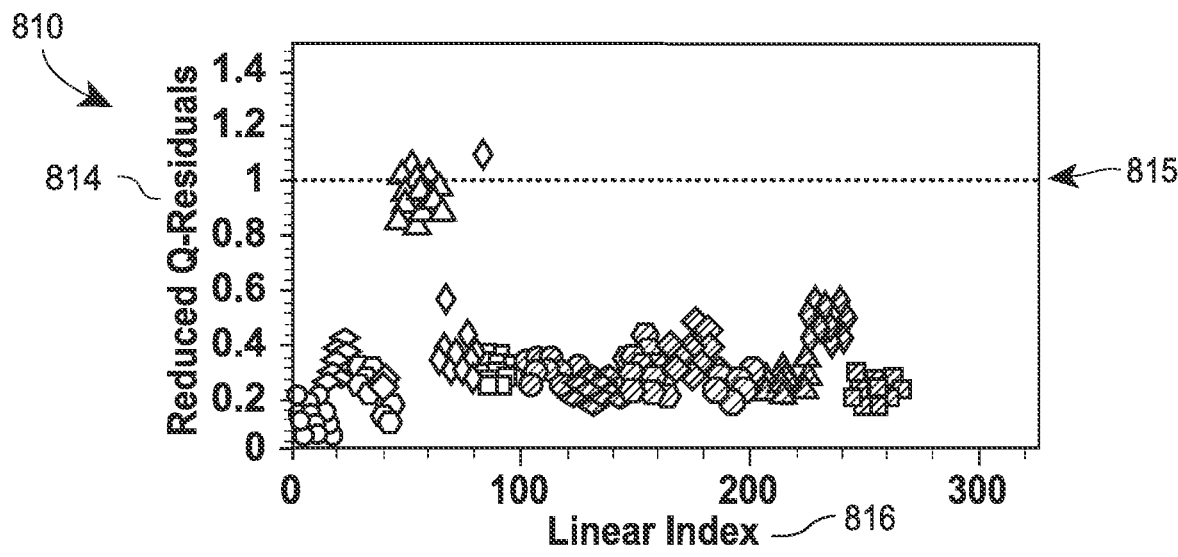

FIGS. 8A-8E presents analysis of the various analyzers 802 (i.e., configurable handheld biological analyzers 1-3 and analyzers 4-18) by plotting the summary statistic, $Q_r$ or $T_r^2$, for each of the target products evaluated against their corresponding biological classification model (e.g., PCA model). For clarity, the validation results in FIGS. 8A-8E are organized according to analyzer number. FIGS. 8A-8D each illustrate example visualizations 800, 810, 820, and 830 of reduced Q-residual errors for a target product (e.g., of Table 1) as evaluated for eighteen different configurable handheld biological analyzers (configurable handheld biological analyzers 1-3 and analyzers 4-18), in accordance with various embodiments described herein. In particular, the visualizations of FIGS. 8A-8D are represented as scatter plots depicting the spread of reduced Q-residuals for the target product of each method evaluated on analyzers 1-18. FIG. 8A illustrates spread of reduced Q-residuals for the target product A1 of Table 1. FIG. 8B illustrates spread of reduced Q-residuals for the target product A2 of Table 1. FIG. 8C illustrates spread of reduced Q-residuals for the target product Q1 of Table 1. And FIG. 8D illustrates spread of reduced Q-residuals for the target product Q2 of Table 1. In each of FIGS. 8A-8D, the dashed horizontal line in each graph (i.e., 805, 815, 825, and 835, respectively) represents the pass-fail criterion or threshold such that a value greater than 1 yields a failing result (i.e., a false-negative). Each linear index (e.g., 806, 816, 826, and 836, respectively) is provided to index Raman spectra in the dataset and is not necessarily related to the sample.

Figure 8E:
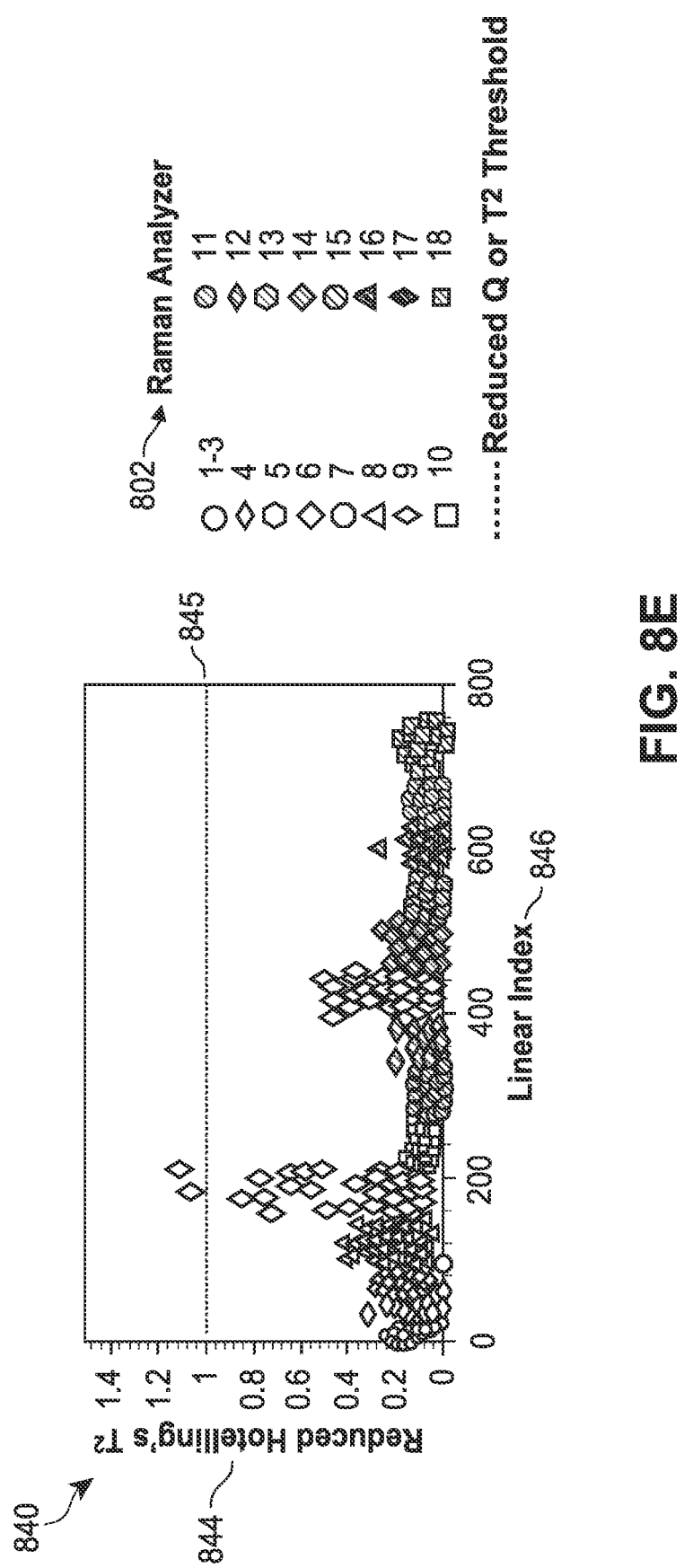
FIG. 8E illustrates an example visualization of reduced summary-of-fit value for a target product as evaluated for eighteen different configurable handheld biological analyzers, in accordance with various embodiments described herein.

FIG. 8E illustrates an example visualization 840 of reduced summary-of-fit value (e.g., Hotelling's $T^2$) for a target product (e.g., B1, B2, and/or B3) as evaluated for eighteen different configurable handheld biological analyzers 802 (configurable handheld biological analyzers 1-3 and analyzers 4-18), in accordance with various embodiments described herein. Dashed horizontal line 845 represents the pass-fail criterion or threshold such that a value greater than 1 yields a failing result (i.e., a false-negative). Linear index 846 is provided to index Raman spectra in the dataset and is not necessarily related to the sample For each of FIGS. 8A-8E, there are no false-negative determinations on analyzers 10-16 and 18. In fact, the summary statistic in most cases is <0.6, suggesting the likelihood of a false-negative on any of these instruments to be exceedingly low. There are 33 erroneous results that are isolated to the remaining three analyzers (8, 9, and 17), each of which had identifiable hardware-based and/or instrument specific performance issues. Analyzer 8, an early pilot build instrument, yielded the largest number of false-negatives. For method A1, 20/20 spectra produced failing $Q_r$ values (e.g., those values greater than 1). However, there were only 3 total false-negatives on the other four methods, suggesting the disparate performance for method Al was likely related to the weak Raman scattering signal for this product due to its low protein concentration (10 mg/mL) and weak excipient bands. Nevertheless, an examination of the residuals for analyzer 8 revealed a broad feature centered at ~1300 cm$^{-1}$ (data not shown). Analyzer 8—an early pilot build instrument—had an optical component different from the production analyzers (1-7 and 9-18) that lead to an observable Raman band, which was contemplated to cause a high rate of failure. For the remaining analyzers (9 and 17), significant instrument performance issues were also noted. The raw wavenumber calibration for analyzer 9 was known to be −3 cm$^{-1}$ outside of the manufacturers specifications. For analyzer 17, a previously unknown laser power/stability issue was identified upon further investigation. Despite these known problems, the true-positive rate exceeded 85% for all five models of FIGS. 8A-8E on both analyzers, providing evidence that the biological classification models (e.g., PCA models) are even tolerant of degraded instrument functionality to a limited degree. Procedural mechanisms (e.g., installation and operational qualifications, regular preventive maintenance) designed to ensure instrument fit-for-use are already in place in Good Manufacturing Practice (GMP) testing of biopharmaceutical products. However, the fact that the laser power issue for analyzer 17 was not known prior to testing highlights the value of a critical evaluation of instrument performance metrics to ensure the long-term performance of the spectrometers and the multivariate models. However, as demonstrated above, the configurable handheld biological analyzer(s), and related biological analytics methods described herein for identification of biological products based on Raman spectroscopy, are robust and fault tolerant, remaining operable and usable, as describe herein, despite instrument hardware-based and/or instrument specific performance issues.

Additional Description

The above description herein describes various devices, assemblies, components, subsystems and methods for use related to a drug delivery device. The devices, assemblies, components, subsystems, methods or drug delivery devices can further comprise or be used with a drug including but not limited to those drugs identified below as well as their generic and biosimilar counterparts. The term drug, as used herein, can be used interchangeably with other similar terms and can be used to refer to any type of medicament or therapeutic material including traditional and non-traditional pharmaceuticals, nutraceuticals, supplements, biologics, biologically active agents and compositions, large molecules, biosimilars, bioequivalents, therapeutic antibodies, polypeptides, proteins, small molecules and generics. Non-therapeutic injectable materials are also encompassed. The drug may be in liquid form, a lyophilized form, or in a reconstituted from lyophilized form. The following example list of drugs should not be considered as all-inclusive or limiting.

The drug will be contained in a reservoir. In some instances, the reservoir is a primary container that is either filled or pre-filled for treatment with the drug. The primary container can be a vial, a cartridge or a pre-filled syringe.

In some embodiments, the reservoir of the drug delivery device may be filled with or the device can be used with colony stimulating factors, such as granulocyte colony-stimulating factor (G-CSF). Such G-CSF agents include but are not limited to Neulasta® (pegfilgrastim, pegylated filgastrim, pegylated G-CSF, pegylated hu-Met-G-CSF) and Neupogen® (filgrastim, G-CSF, hu-MetG-CSF).

In other embodiments, the drug delivery device may contain or be used with an erythropoiesis stimulating agent (ESA), which may be in liquid or lyophilized form. An ESA is any molecule that stimulates erythropoiesis. In some embodiments, an ESA is an erythropoiesis stimulating protein. As used herein, "erythropoiesis stimulating protein" means any protein that directly or indirectly causes activation of the erythropoietin receptor, for example, by binding to and causing dimerization of the receptor. Erythropoiesis stimulating proteins include erythropoietin and variants, analogs, or derivatives thereof that bind to and activate erythropoietin receptor; antibodies that bind to erythropoietin receptor and activate the receptor; or peptides that bind to and activate erythropoietin receptor. Erythropoiesis stimulating proteins include, but are not limited to, Epogen® (epoetin alfa), Aranesp® (darbepoetin alfa), Dynepo® (epoetin delta), Mircera® (methoxy polyethylene glycol-epoetin beta), Hematide®, MRK-2578, INS-22, Retacrit® (epoetin zeta), Neorecormon® (epoetin beta), Silapo® (epoetin zeta), Binocrit® (epoetin alfa), epoetin alfa Hexal, Abseamed® (epoetin alfa), Ratioepo® (epoetin theta), Eporatio® (epoetin theta), Biopoin® (epoetin theta), epoetin alfa, epoetin beta, epoetin iota, epoetin omega, epoetin delta, epoetin zeta, epoetin theta, and epoetin delta, pegylated erythropoietin, carbamylated erythropoietin, as well as the molecules or variants or analogs thereof.

Among particular illustrative proteins are the specific proteins set forth below, including fusions, fragments, analogs, variants or derivatives thereof: OPGL specific antibodies, peptibodies, related proteins, and the like (also referred to as RANKL specific antibodies, peptibodies and the like), including fully humanized and human OPGL specific antibodies, particularly fully humanized monoclonal antibodies; Myostatin binding proteins, peptibodies, related proteins, and the like, including myostatin specific peptibodies; IL-4 receptor specific antibodies, peptibodies, related proteins, and the like, particularly those that inhibit activities mediated by binding of IL-4 and/or IL-13 to the receptor; Interleukin 1-receptor 1 ("IL1-R1") specific antibodies, peptibodies, related proteins, and the like; Ang2 specific antibodies, peptibodies, related proteins, and the like; NGF specific antibodies, peptibodies, related proteins, and the like; CD22 specific antibodies, peptibodies, related proteins, and the like, particularly human CD22 specific antibodies, such as but not limited to humanized and fully human antibodies, including but not limited to humanized and fully human monoclonal antibodies, particularly including but not limited to human CD22 specific IgG antibodies, such as, a dimer of a human-mouse monoclonal hLL2 gamma-chain disulfide linked to a human-mouse monoclonal hLL2 kappa-chain, for example, the human CD22 specific fully humanized antibody in Epratuzumab, CAS registry number 501423-23-0; IGF-1 receptor specific antibodies, peptibodies, and related proteins, and the like including but not limited to anti-IGF-1R antibodies; B-7 related protein 1 specific antibodies, peptibodies, related proteins and the like ("B7RP-1" and also referring to B7H2, ICOSL, B7h, and CD275), including but not limited to B7RP-specific fully human monoclonal IgG2 antibodies, including but not limited to fully human IgG2 monoclonal antibody that binds an epitope in the first immunoglobulin-like domain of B7RP-1, including but not limited to those that inhibit the interaction of B7RP-1 with its natural receptor, ICOS, on activated T cells; IL-15 specific antibodies, peptibodies, related proteins, and the like, such as, in particular, humanized monoclonal antibodies, including but not limited to HuMax IL-15 antibodies and related proteins, such as, for instance, 146B7; IFN gamma specific antibodies, peptibodies, related proteins and the like, including but not limited to human IFN gamma specific antibodies, and including but not limited to fully human anti-IFN gamma antibodies; TALL-1 specific antibodies, peptibodies, related proteins, and the like, and other TALL specific binding proteins; Parathyroid hormone ("PTH") specific antibodies, peptibodies, related proteins, and the like; Thrombopoietin receptor ("TPO-R") specific antibodies, peptibodies, related proteins, and the like; Hepatocyte growth factor ("HGF") specific antibodies, peptibodies, related proteins, and the like, including those that target the HGF/SF:cMet axis (HGF/SF:c-Met), such as fully human monoclonal antibodies that neutralize hepatocyte growth factor/scatter (HGF/SF); TRAIL-R2 specific antibodies, peptibodies, related proteins and the like; Activin A specific antibodies, peptibodies, proteins, and the like; TGF-beta specific antibodies, peptibodies, related proteins, and the like; Amyloid-beta protein specific antibodies, peptibodies, related proteins, and the like; c-Kit specific antibodies, peptibodies, related proteins, and the like, including but not limited to proteins that bind c-Kit and/or other stem cell factor receptors; OX40L specific antibodies, peptibodies, related proteins, and the like, including but not limited to proteins that bind OX40L and/or other ligands of the 0X40 receptor; Activase® (alteplase, tPA); Aimovig® (erenumab) Aranesp® (darbepoetin alfa); Epogen® (epoetin alfa, or erythropoietin); GLP-1, Avonex® (interferon beta-1a); Bexxar® (tositumomab, anti-CD22 monoclonal antibody); Betaseron® (interferon-beta); Campath® (alemtuzumab, anti-CD52 monoclonal antibody); Dynepo® (epoetin delta); Velcade® (bortezomib); MLN0002 (anti-α4ß7 mAb);

MLN1202 (anti-CCR2 chemokine receptor mAb); Enbrel® (etanercept, TNF-receptor/Fc fusion protein, TNF blocker); Eprex® (epoetin alfa); Erbitux® (cetuximab, anti-EGFR/ HER1/c-ErbB-1); Evenity® (romosozumab) Genotropin® (somatropin, Human Growth Hormone); Herceptin® (trastuzumab, anti-HER2/neu (erbB2) receptor mAb); Humatrope® (somatropin, Human Growth Hormone); Humira® (adalimumab); Vectibix® (panitumumab), Xgeva® (denosumab), Prolia® (denosumab), Enbrel® (etanercept, TNF-receptor/Fc fusion protein, TNF blocker), Nplate® (romiplostim), rilotumumab, ganitumab, conatumumab, brodalumab, insulin in solution; Infergen® (interferon alfacon-1); Natrecor® (nesiritide; recombinant human B-type natriuretic peptide (hBNP); Kineret® (anakinra); Leukine® (sargamostim, rhuGM-CSF); LymphoCide® (epratuzumab, anti-CD22 mAb); Benlysta™ (lymphostat B, belimumab, anti-BlyS mAb); Metalyse® (tenecteplase, t-PA analog); Mircera® (methoxy polyethylene glycol-epoetin beta); Mylotarg® (gemtuzumab ozogamicin); Raptiva® (efalizumab); Cimzia® (certolizumab pegol, CDP 870); Soliris™ (eculizumab); pexelizumab (anti-C5 complement); Numax® (MEDI-524); Lucentis® (ranibizumab); Panorex® (17-1A, edrecolomab); Trabio® (lerdelimumab); TheraCim hR3 (nimotuzumab); Omnitarg (pertuzumab, 2C4); Osidem® (IDM-1); OvaRex® (B43.13); Nuvion® (visilizumab); cantuzumab mertansine (huC242-DM1); NeoRecormon® (epoetin beta); Neumega® (oprelvekin, human interleukin-11); Orthoclone OKT3® (muromonab-CD3, anti-CD3 monoclonal antibody); Procrit® (epoetin alfa); Remicade® (infliximab, anti-TNFα monoclonal antibody); Reopro® (abciximab, anti-GP IIb/IIIa receptor monoclonal antibody); Actemra® (anti-IL6 Receptor mAb); Avastin® (bevacizumab), HuMax-CD4 (zanolimumab); Rituxan® (rituximab, anti-CD20 mAb); Tarceva® (erlotinib); Roferon-A®-(interferon alfa-2a); Simulect® (basiliximab); Prexige® (lumiracoxib); Synagis® (palivizumab); 146B7-CHO (anti-IL15 antibody, see U.S. Pat. No. 7,153, 507); Tysabri® (natalizumab, anti-α4integrin mAb); Valortim® (MDX-1303, anti-B. anthracis protective antigen mAb); ABthrax™; Xolair® (omalizumab); ETI211 (anti-MRSA mAb); IL-1 trap (the Fc portion of human IgG1 and the extracellular domains of both IL-1 receptor components (the Type I receptor and receptor accessory protein)); VEGF trap (Ig domains of VEGFR1 fused to IgG1 Fc); Zenapax® (daclizumab); Zenapax® (daclizumab, anti-IL-2Rα mAb); Zevalin® (ibritumomab tiuxetan); Zetia® (ezetimibe); Orencia® (atacicept, TACI-Ig); anti-CD80 monoclonal antibody (galiximab); anti-CD23 mAb (lumiliximab); BR2-Fc (huBR3/huFc fusion protein, soluble BAFF antagonist); CNTO 148 (golimumab, anti-TNFα mAb); HGS-ETR1 (mapatumumab; human anti-TRAIL Receptor-1 mAb); HuMax-CD20 (ocrelizumab, anti-CD20 human mAb); HuMax-EGFR (zalutumumab); M200 (volociximab, anti-α5β1 integrin mAb); MDX-010 (ipilimumab, anti-CTLA-4 mAb and VEGFR-1 (IMC-18F1); anti-BR3 mAb; anti-C. difficile Toxin A and Toxin B C mAbs MDX-066 (CDA-1) and MDX-1388); anti-CD22 dsFv-PE38 conjugates (CAT-3888 and CAT-8015); anti-CD25 mAb (HuMax-TAC); anti-CD3 mAb (NI-0401); adecatumumab; anti-CD30 mAb (MDX-060); MDX-1333 (anti-IFNAR); anti-CD38 mAb (HuMax CD38); anti-CD40L mAb; anti-Cripto mAb; anti-CTGF Idiopathic Pulmonary Fibrosis Phase I Fibrogen (FG-3019); anti-CTLA4 mAb; anti-eotaxin1 mAb (CAT-213); anti-FGF8 mAb; anti-ganglioside GD2 mAb; anti-ganglioside GM2 mAb; anti-GDF-8 human mAb (MYO-029); anti-GM-CSF Receptor mAb (CAM-3001); anti-HepC mAb (HuMax HepC); anti-IFNα mAb (MEDI-545, MDX-1103); anti-IGF1R mAb; anti-IGF-1R mAb (HuMax-Inflam); anti-IL12 mAb (ABT-874); anti-IL12/1L23 mAb (CNTO 1275); anti-IL13 mAb (CAT-354); anti-IL2Ra mAb (HuMax-TAC); anti-IL5 Receptor mAb; anti-integrin receptors mAb (MDX-018, CNTO 95); anti-IP10 Ulcerative Colitis mAb (MDX-1100); BMS-66513; anti-Mannose Receptor/hCGβ mAb (MDX-1307); anti-mesothelin dsFv-PE38 conjugate (CAT-5001); anti-PD1mAb (MDX-1106 (ONO-4538)); anti-PDGFRα antibody (IMC-3G3); anti-TGFß mAb (GC-1008); anti-TRAIL Receptor-2 human mAb (HGS-ETR2); anti-TWEAK mAb; anti-VEGFR/Flt-1 mAb; and anti-ZP3 mAb (HuMax-ZP3).

In some embodiments, the drug delivery device may contain or be used with a sclerostin antibody, such as but not limited to romosozumab, blosozumab, or BPS 804 (Novartis) and in other embodiments, a monoclonal antibody (IgG) that binds human Proprotein Convertase Subtilisin/Kexin Type 9 (PCSK9). Such PCSK9 specific antibodies include, but are not limited to, Repatha® (evolocumab) and Praluent® (alirocumab). In other embodiments, the drug delivery device may contain or be used with rilotumumab, bixalomer, trebananib, ganitumab, conatumumab, motesanib diphosphate, brodalumab, vidupiprant or panitumumab. In some embodiments, the reservoir of the drug delivery device may be filled with or the device can be used with IMLYGIC® (talimogene laherparepvec) or another oncolytic HSV for the treatment of melanoma or other cancers including but are not limited to OncoVEXGALV/ CD; OrienX010; G207, 1716; NV1020; NV12023; NV1034; and NV1042. In some embodiments, the drug delivery device may contain or be used with endogenous tissue inhibitors of metalloproteinases (TIMPs) such as but not limited to TIMP-3. Antagonistic antibodies for human calcitonin gene-related peptide (CGRP) receptor such as but not limited to erenumab and bispecific antibody molecules that target the CGRP receptor and other headache targets may also be delivered with a drug delivery device of the present disclosure. Additionally, bispecific T cell engager (BiTE®) antibodies such as but not limited to BLINCYTO® (blinatumomab) can be used in or with the drug delivery device of the present disclosure. In some embodiments, the drug delivery device may contain or be used with an APJ large molecule agonist such as but not limited to apelin or analogues thereof. In some embodiments, a therapeutically effective amount of an anti-thymic stromal lymphopoietin (TSLP) or TSLP receptor antibody is used in or with the drug delivery device of the present disclosure.

Although the drug delivery devices, assemblies, components, subsystems and methods have been described in terms of exemplary embodiments, they are not limited thereto. The detailed description is to be construed as exemplary only and does not describe every possible embodiment of the present disclosure. Numerous alternative embodiments could be implemented, using either current technology or technology developed after the filing date of this patent that would still fall within the scope of the claims defining the invention(s) disclosed herein.

Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

The term "coupled to" used herein does not require a direct coupling or connection, such that two items may be "coupled to" one another through one or more intermediary components or other elements, such as an electronic bus, electrical wiring, mechanical component, or other such indirect connection.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A configurable handheld biological analyzer for identification of biological products based on Raman spectroscopy, the configurable handheld biological analyzer comprising:
   a first housing adapted for handheld manipulation;
   a first scanner carried by the first housing;
   a first processor communicatively coupled to the first scanner; and
   a first computer memory communicatively coupled to the first processor,
   wherein the first computer memory is configured to load a biological classification model configuration, the biological classification model configuration comprising a biological classification model, wherein the biological classification model is configured to execute on the first processor, the first processor configured to (1) receive a first Raman-based spectra dataset defining a first biological product sample as scanned by the first scanner, and (2) identify, with the biological classification model, a biological product type based on the first Raman-based spectra dataset,
   wherein the biological classification model configuration further comprises a spectral preprocessing algorithm, the first processor configured to execute the spectral preprocessing algorithm to reduce a spectral variance of the first Raman-based spectra dataset when the first Raman-based spectra dataset is received by the first processor, and
   wherein the biological classification model comprises a classification component selected to reduce at least one of (1) a Q-residual error of the biological classification model, or (2) a summary-of-fit value of the biological classification model, the biological classification model configured to identify the biological product type of the first biological product sample based on the classification component.

2. The configurable handheld biological analyzer of claim 1, wherein the biological classification model configuration is electronically transferrable to a second configurable handheld biological analyzer, the second configurable handheld biological analyzer comprising:
   a second housing adapted for handheld manipulation;
   a second scanner coupled to the second housing;
   a second processor communicatively coupled to the second scanner; and
   a second computer memory communicatively coupled to the second processor,
   wherein the second computer memory is configured to load the biological classification model configuration, the biological classification model configuration comprising the biological classification model, wherein the biological classification model is configured to execute on the second processor, the second processor configured to (1) receive a second Raman-based spectra dataset defining a second biological product sample as scanned by the second scanner, and (2) identify, with the biological classification model, the biological product type based on the second Raman-based spectra dataset,
   wherein the second biological product sample is a new sample of the biological product type.

3. The configurable handheld biological analyzer of claim 1, wherein the spectral variance is an analyzer-to-analyzer spectral variance between the first Raman-based spectra dataset and one or more other Raman-based spectra datasets of one or more corresponding other handheld biological analyzers, each of the one or more other Raman-based spectra datasets representative of the biological product type, and
   wherein the spectral preprocessing algorithm is configured to reduce the analyzer-to-analyzer spectral variance between the first Raman-based spectra dataset and the one or more other Raman-based spectra datasets.

4. The configurable handheld biological analyzer of claim 3, wherein the spectral preprocessing algorithm comprises:
   applying a derivative transformation to the first Raman-based spectra dataset to generate a modified Raman-based spectra dataset,
   aligning the modified Raman-based spectra dataset across a Raman shift axis, and
   normalizing the modified Raman-based spectra dataset across a Raman intensity axis.

5. The configurable handheld biological analyzer of claim 1, wherein the classification component is selected to reduce both of (1) the Q-residual error of the biological classification model and (2) the summary-of-fit value of the biological classification model.

6. The configurable handheld biological analyzer of claim 1, wherein the biological classification model further comprises a second classification component, the biological classification model configured to identify the biological product type of the first biological product sample based on the classification component and the second classification component.

7. The configurable handheld biological analyzer of claim 1, wherein the biological classification model is implemented as a principal component analysis (PCA) model.

8. The configurable handheld biological analyzer of claim 1, wherein the computer memory is configured to load a new biological classification model, the new biological classification model comprising an updated classification component.

9. The configurable handheld biological analyzer of claim 1, wherein the biological product type is of a therapeutic product.

10. The configurable handheld biological analyzer of claim 1, wherein biological classification model is configured to distinguish, based on the classification component, the first biological product sample having the biological product type from a different biological product sample having a different biological product type.

11. The configurable handheld biological analyzer of claim 10, wherein the biological product type and the different biological product type each have distinct localized features within a same or similar Raman spectra range.

12. The configurable handheld biological analyzer of claim 1, wherein the biological classification model is configured to identify the biological product type of the first biological product sample based on the classification component when the Q-residual error or the summary-of-fit value satisfies a threshold value.

13. The configurable handheld biological analyzer of claim 12, wherein the biological classification model outputs a pass-fail determination based on the threshold value.

14. The configurable handheld biological analyzer of claim 1, wherein the biological classification model is generated by a remote processor being remote to the configurable handheld biological analyzer.

15. A biological analytics method for identification of biological products based on Raman spectroscopy, the biological analytics method comprising:

loading, into a first computer memory of a first configurable handheld biological analyzer having a first processor and a first scanner, a biological classification model configuration, the biological classification model configuration comprising a biological classification model;

receiving, by the biological classification model, a first Raman-based spectra dataset defining a first biological product sample as scanned by the first scanner;

executing a spectral preprocessing algorithm of the biological classification model to reduce a spectral variance of the first Raman-based spectra dataset; and identifying, with the biological classification model, a biological product type based on the first Raman-based spectra dataset, wherein the biological classification model comprises a classification component selected to reduce at least one of (1) a Q-residual error of the biological classification model, or (2) a summary-of-fit value of the biological classification model, the biological classification model configured to identify the biological product type of the first biological product sample based on the classification component.

16. The biological analytics method of claim 15, wherein the biological classification model configuration is electronically transferrable to a second configurable handheld biological analyzer, the biological analytics method further comprising:

loading, into a second computer memory of a second configurable handheld biological analyzer having a second processor and a second scanner, the biological classification model configuration, the biological classification model configuration comprising the biological classification model;

receiving, by the biological classification model, a second Raman-based spectra dataset defining a second biological product sample as scanned by the second scanner;

executing the spectral preprocessing algorithm of the biological classification model to reduce a second spectral variance of the second Raman-based spectra dataset; and identifying, with the biological classification model, the biological product type based on the second Raman-based spectra dataset, wherein the second biological product sample is a new sample of the biological product type.

17. The biological analytics method of claim 15, wherein the spectral variance is an analyzer-to-analyzer spectral variance between the first Raman-based spectra dataset and one or more other Raman-based spectra datasets of one or more corresponding other handheld biological analyzers, each of the one or more other Raman-based spectra datasets representative of the biological product type, and wherein the spectral preprocessing algorithm is configured to reduce the analyzer-to-analyzer spectral variance between the first Raman-based spectra dataset and the one or more other Raman-based spectra datasets.

18. The biological analytics method of claim 17, wherein the spectral preprocessing algorithm comprises:

applying a derivative transformation to the first Raman-based spectra dataset to generate a modified Raman-based spectra dataset, aligning the modified Raman-based spectra dataset across a Raman shift axis, and normalizing the modified Raman-based spectra dataset across a Raman intensity axis.

19. The biological analytics method of claim 15, wherein the biological product type is of a therapeutic product.

20. A tangible, non-transitory computer-readable medium storing instructions for identification of biological products based on Raman spectroscopy, that when executed by one or more processors of a configurable handheld biological analyzer cause the one or more processors of the configurable handheld biological analyzer to:

load, into a computer memory of the configurable handheld biological analyzer having a scanner, a biological classification model configuration, the biological classification model configuration comprising a biological classification model;

receive, by the biological classification model, a Raman-based spectra dataset defining a biological product sample as scanned by the scanner;

execute a spectral preprocessing algorithm of the biological classification model to reduce a spectral variance of the Raman-based spectra dataset; and identify, with the biological classification model, a biological product type based on the Raman-based spectra dataset, wherein the biological classification model comprises a classification component selected to reduce at least one of (1) a Q-residual error of the biological classification model, or (2) a summary-of-fit value of the biological classification model, the biological classification model configured to identify the biological product type of the biological product sample based on the classification component.

* * * * *